March 10, 1959 — I. H. SUBLETTE ET AL — 2,877,446

INFORMATION HANDLING DEVICE

Filed Dec. 28, 1954 — 7 Sheets-Sheet 1

INVENTORS
IVAN H. SUBLETTE,
ARTHUR D. BEARD,
LOWELL S. BENSKY,
STEPHEN M. FILLEBROWN &
LINDER C. HOBBS

BY Milton S. Winters

ATTORNEY

March 10, 1959 I. H. SUBLETTE ET AL 2,877,446

INFORMATION HANDLING DEVICE

Filed Dec. 28, 1954

7 Sheets-Sheet 2

INVENTORS
IVAN H. SUBLETTE,
ARTHUR D. BEARD,
LOWELL S. BENSKY,
STEPHEN M. FILLEBROWN
& LINDER C. HOBBS

BY Milton S. Winters

ATTORNEY

INVENTORS
IVAN H. SUBLETTE,
ARTHUR D. BEARD,
LOWELL S. BENSKY,
STEPHEN M. FILLEBROWN &
LINDER C. HOBBS
BY Milton S. Winters
ATTORNEY INVENTORS
IVAN H. SUBLETTE,
ARTHUR D. BEARD,
LOWELL S. BENSKY,
STEPHEN M. FILLEBROWN &
LINDER C. HOBBS
BY Milton S. Winters
ATTORNEY March 10, 1959 I. H. SUBLETTE ET AL 2,877,446

INFORMATION HANDLING DEVICE

Filed Dec. 28, 1954 7 Sheets-Sheet 5

INVENTORS
IVAN H. SUBLETTE,
ARTHUR D. BEARD,
LOWELL S. BENSKY,
STEPHEN M. FILLEBROWN
& LINDER C. HOBBS

BY Milton S. Winters
ATTORNEY

INVENTORS
IVAN H. SUBLETTE,
ARTHUR D. BEARD,
LOWELL S. BENSKY,
STEPHEN M. FILLEBROWN &
LINDER C. HOBBS

BY Milton S. Winters
ATTORNEY

March 10, 1959 I. H. SUBLETTE ET AL 2,877,446

INFORMATION HANDLING DEVICE

Filed Dec. 28, 1954 7 Sheets-Sheet 7

INVENTORS
IVAN H. SUBLETTE,
ARTHUR D. BEARD,
LOWELL S. BENSKY,
STEPHEN M. FILLEBROWN
& LINDER C. HOBBS

BY Milton S. Winters

ATTORNEY

United States Patent Office 2,877,446

Patented Mar. 10, 1959

2,877,446

INFORMATION HANDLING DEVICE

Ivan H. Sublette and Arthur D. Beard, Haddonfield, N. J., Lowell S. Bensky, Levittown, Pa., Linder C. Hobbs, Haddonfield, N. J., and Stephen M. Fillebrown, Waterford, Maine, assignors to Radio Corporation of America, a corporation of Delaware Application December 28, 1954, Serial No. 478,022

18 Claims. (Cl. 340—173)

TABLE OF CONTENTS

Figure 1:
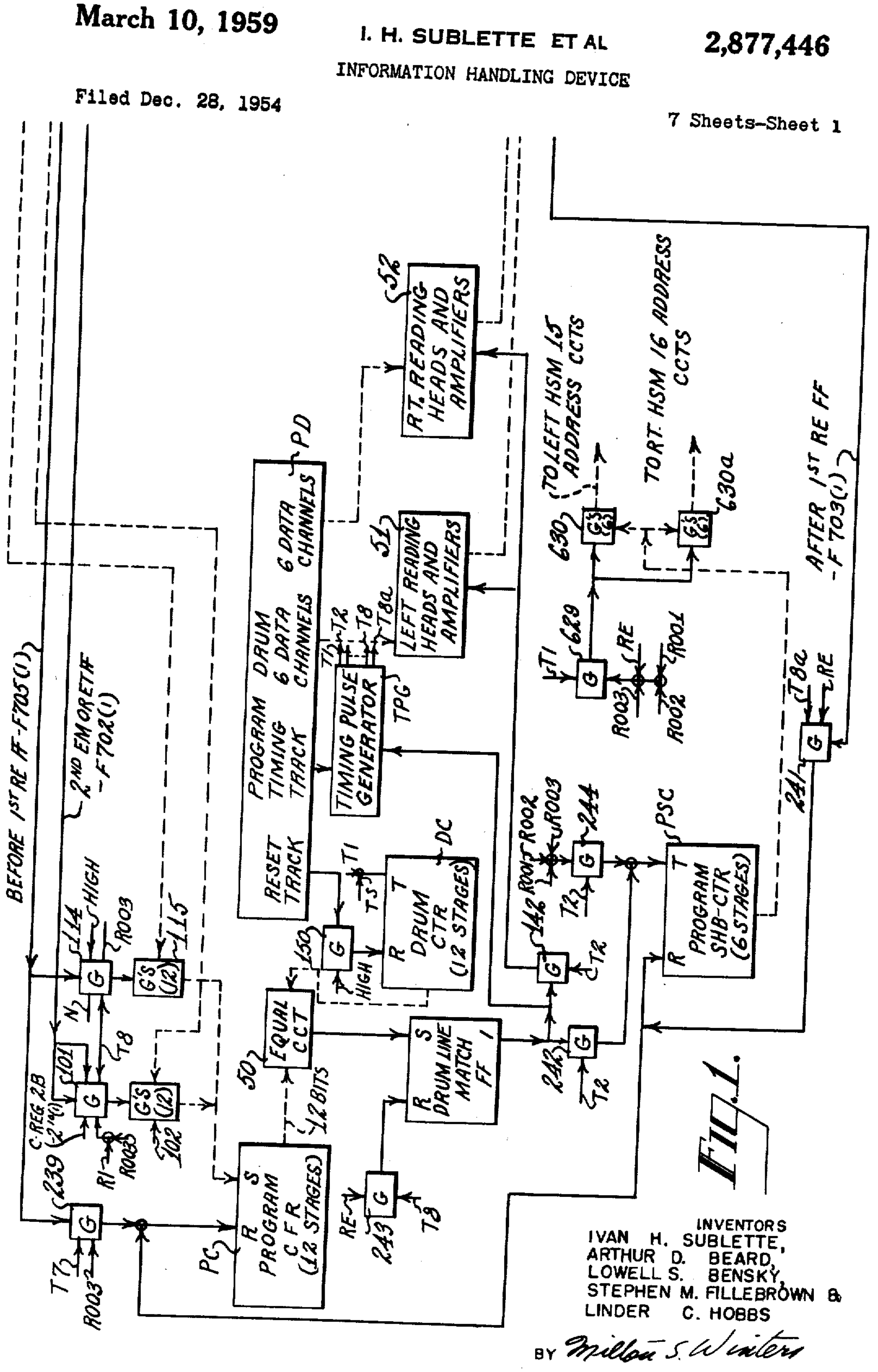

| | Column |
|---|---|
| 1. Introduction | 1 |
| 2. Detailed description | 4 |
| 2.1 Description of circuits—preliminary | 4 |
| 2.2 Description of circuits of Fig. 1 | 4 |
| 2.3 Description of circuits of Fig. 2 | 7 |
| 2.4 Description of circuits of Fig. 3 | 9 |
| 2.5 Description of circuits of Fig. 4 | 10 |
| 2.6 Description of circuits of Fig. 5 | 12 |
| 2.7 Description of circuits of Fig. 6 | 13 |
| 3. Machine operation | 15 |
| 3.1 Staticizing instruction | 15 |
| 3.1.1 Status level R001 high | 15 |
| 3.1.2 Status level R002 high | 16 |
| 3.1.3 Status level R003 high | 17 |
| 3.2 Performing operation N | 18 |
| 3.2.1 Status level RE high—start surge of addresses | 18 |
| 3.2.2 Address surge—status level RI high | 18 |
| 3.2.3 Continuation of address surge | 19 |
| 3.2.4 Status level R003 high—after address surge | 20 |
| 3.2.5 Status level RD high—cycling | 21 |
| 3.2.6 Status level RI high—first character from tape | 22 |
| 3.2.7 RD–RI sequence | 23 |
| 3.2.8 Status level RD high—item separation symbol (ISS) | 23 |
| 3.2.9 Status level R003 high—after ISS recognition | 23 |
| 3.2.10 Status level RI high—next message started | 23 |
| 3.2.11 Status level RD high—successive item separation symbols | 24 |
| 3.2.12 Status level RD high—end message (EM) symbol | 24 |
| 3.2.13 Status level RI high—after end of message (EM) | 24 |
| 3.2.13*a* EM or end tape (ET) and last address | 24 |
| 3.2.13*b* EM or ET and not last address | 26 |
| 3.2.14 Status level R003 high—after status level RI high, and after EM or ET and not last item address | 26 |
| 3.2.15 Status level RI high—after status level RI high, and after EM or ET and not last item address | 26 |
| 3.2.16 Status level RI high—with end of tape (ET) | 27 |
| 3.3 Flow of status levels and summary of operation | 28 |
| 4. Conclusion | 31 |

1. INTRODUCTION

The present invention relates to information handling devices, and particularly to a method and system for entering information into the internal memory of an information handling device.

A computer is one example of an information handling device which employs an internal memory. Information is applied to the computer from an input to the internal memory. A program control unit of the computer controls the flow of the information between the internal memory and other units of the computer, such as an arithmetic unit. The information may then be applied to the computer output. The information may be in the form of characters, each character comprising a group of coded binary signals. An item (sometimes called a word) may be made up of a group of successive characters. A message may include a group of items.

To afford adequate storage of the large amounts of information often encountered in modern electronic computers, a serial form of external memory is often employed. The information from the serial memory is applied to the input of the computer. For example, magnetic tape or paper tape are often used as the external, serial storage means for the storage of a large bulk of information which is to be applied to the computer.

The internal memory of a computer is preferably of a high speed, and although it may be cyclical, is preferably of the random access type so that the flow of information may be rapidly handled in response to the program control. Thus, in performing an operation, an excessive wait for access to information in a cyclic memory is avoided, any information as needed being randomly accessible quickly.

A high density of packing of information is desirable in both the internal and external memories of an information handling device. A high density of packing is of special importance on the input tape, because an input tape is often used repeatedly, sometimes in conjunction with other equipment. For this reason, and also for the convenience of an operator, it is desirable that the items be written successively on a tape, without standard lengths, and including only the characters present in an item. Also items need not be filled out to their assigned maxima, as by adding space or blank symbols in the external memory. With such an arrangement, the operator (or a suitable machine) may prepare the messages for tape with a minimum of effort and with the least checking for accuracy, by having one item following immediately after another on the external storage medium. Therefore, it is desirable that the information handling device accommodate the variable length messages. As will be more fully apparent, provision is made for such handling by providing for non-standard maximum lengths of entry spaces in the internal memory of the device, the assigned maximum lengths for each item being subject to change, at the will of the operator.

If the items may be of variable length and the messages also may be of variable length, the internal density of storage, as well as the density of external storage, is enhanced. In the internal memory of the computer, the provision of a non-standard maximum number of entry elements to receive each item avoids the waste space attendant on standard lengths, and avoids the difficulties involved in changing a standard maximum with each change of operation or problem. In this fashion, the internal memory of the computer is used with great efficiency.

It is an object of the present invention to provide a system and method of entering serially presented items in variable, non-standard maximum item lengths into the internal memory of an information handling device.

It is another object of the present invention to provide a system and method for entering information serially presented at desired preselected addresses in a random access memory.

Another object of the invention is to provide an information handling device having an internal memory with a system and method for entering information presented in serial form into said memory at addresses which may be preselected at the will of an operator.

Another object of the present invention is to provide a computer which affords flexibility of programming by providing a means and method for the operator to arrange variable length items in non-standard maximum length places in the computer memory with flexibility and ease, regardless of the serial sequence of the incoming information.

A further object of the invention is to provide an information handling device in which serially presented information of variable length items may be entered in the static memeory of the device at different addresses selected as desired.

A further object is to provide a device as just mentioned in which non-standard maximum lengths of entries are provided for the variable length items.

Still another object of the invention is to provide a novel method of and means for entering serially presented information at addresses of the internal memory of a device, which addresses may be selected at will or preselected.

A further object of the invention is to provide a method of and means for entering serially presented variable length information in non-standard maxima lengths in a random access memory, at preselected addresses therein.

In accordance with the invention, the addresses for the successive items are stored in a memory section, which may be a portion of the internal memory of an information handling device, for example, a computer. Means are provided for detecting the occurrence of special symbols which separate the items to be entered. On the occurrence of each special symbol, an address is withdrawn from its location in the memory section, and this withdrawn address is employed to enter the succeeding item in the memory. Thus, addresses in succeeding places in the memory section may be preselected at will by the operator.

Preferably, provision is made for "surging" these addresses into the memory section of an internal, random access memory, for example of a computer, from a cyclic storage means, such as the magnetic program drum of the computer. Thus, the operator can enter the preselected addresses on the drum when preparing the program. The addresses are then surged into the memory section that serves as a surge tank, for example in the manner described in the patent to Bensky et al., 2,679,638. The addresses may be withdrawn one at a time on recognition of a special symbol, and the following item is then read into the memory at the specified address. Upon the occurrence of the next special symbol, an address is withdrawn from the succeeding place in the memory section and the item following this second symbol is stored at the new address, etc. Accordingly, the programmer may operate with variable, non-standard maximum item lengths, allowing only so much space in the internal memory for each item as the maximum possible length of each item individually. Furthermore, each item is successively entered at any desired location in the static memory, either close to or remote from any other item, at addresses related or unrelated to those of any other desired item.

Figure 5:
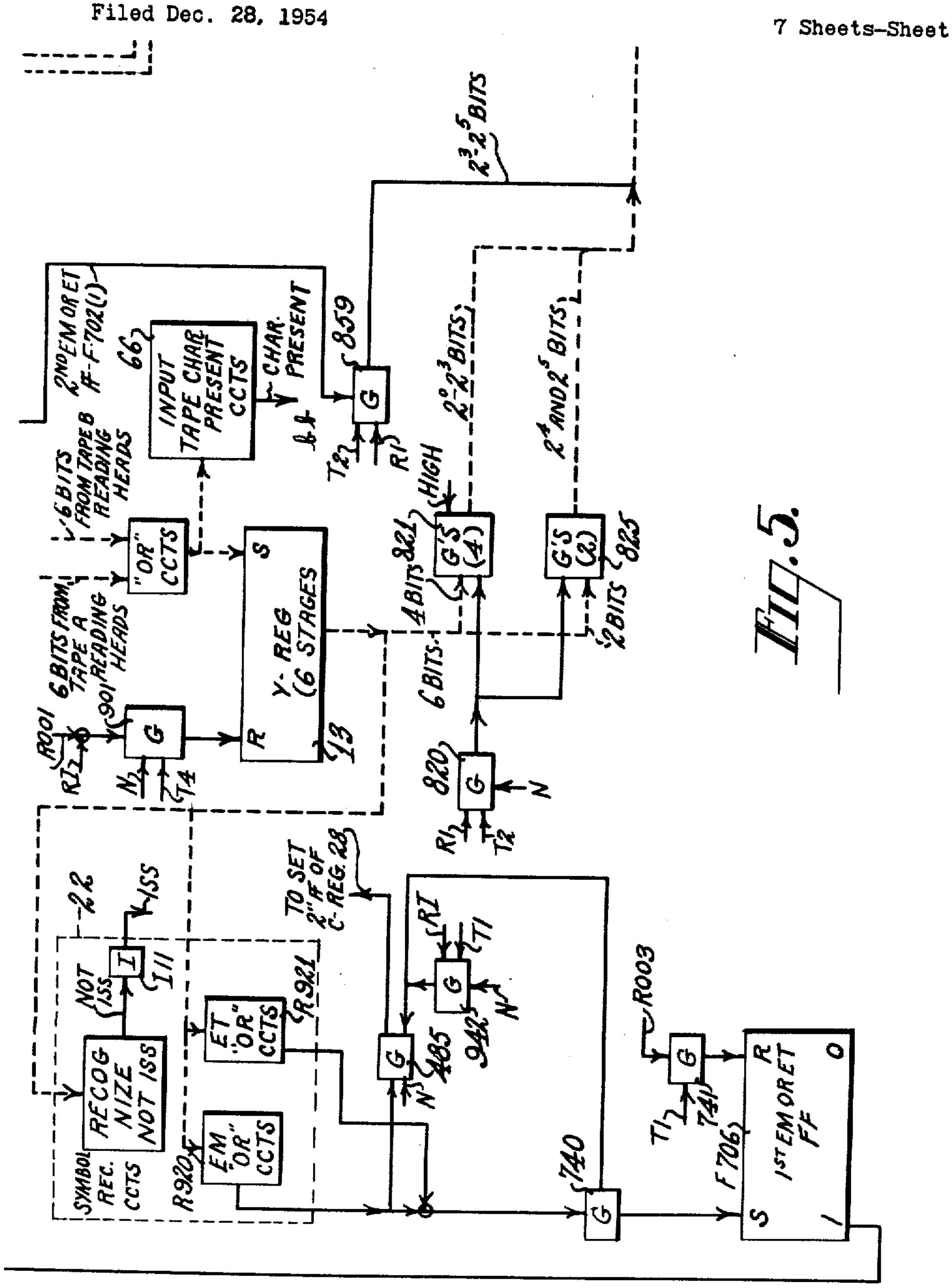
Figure 6:
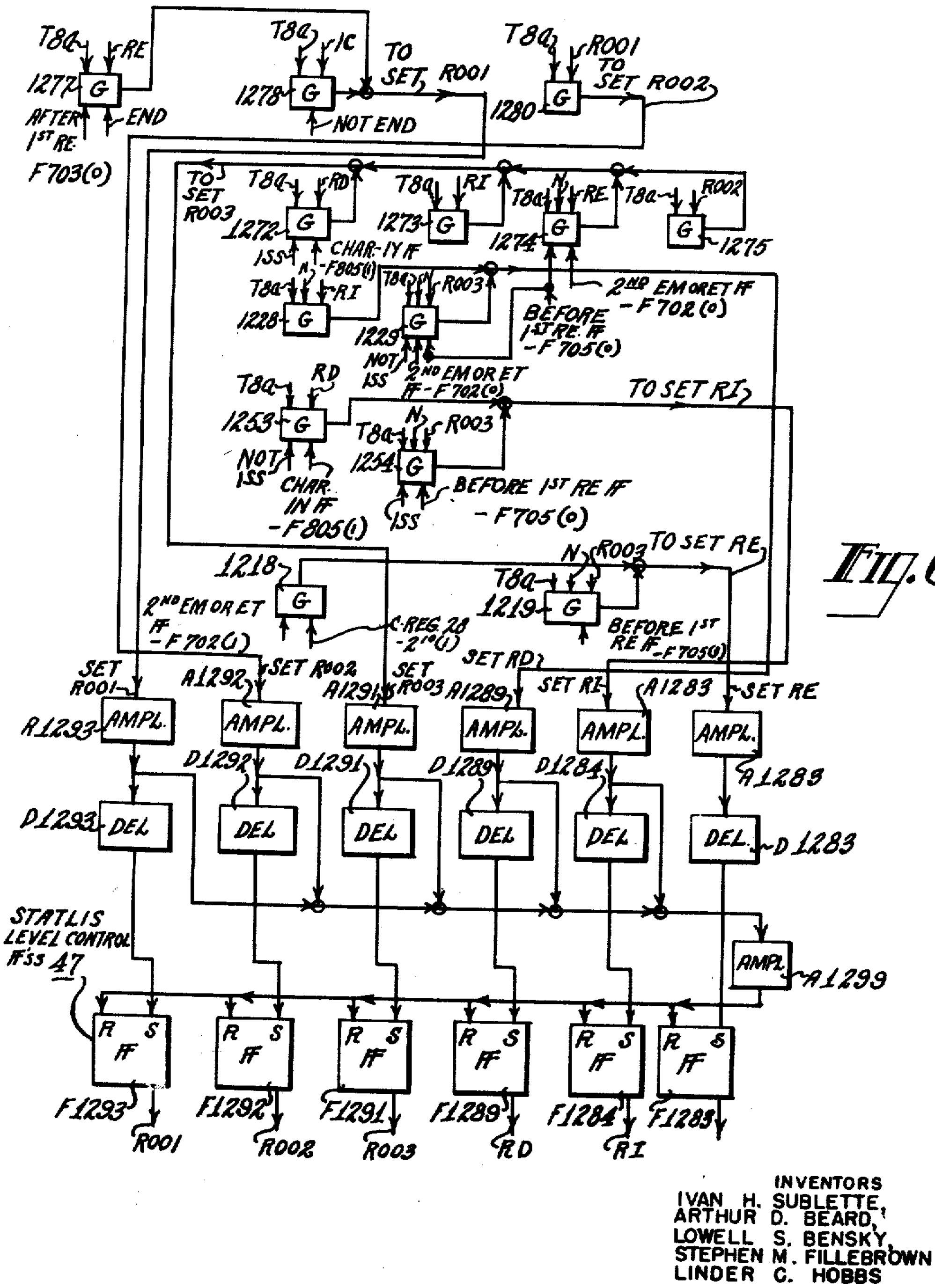
Figure 7:
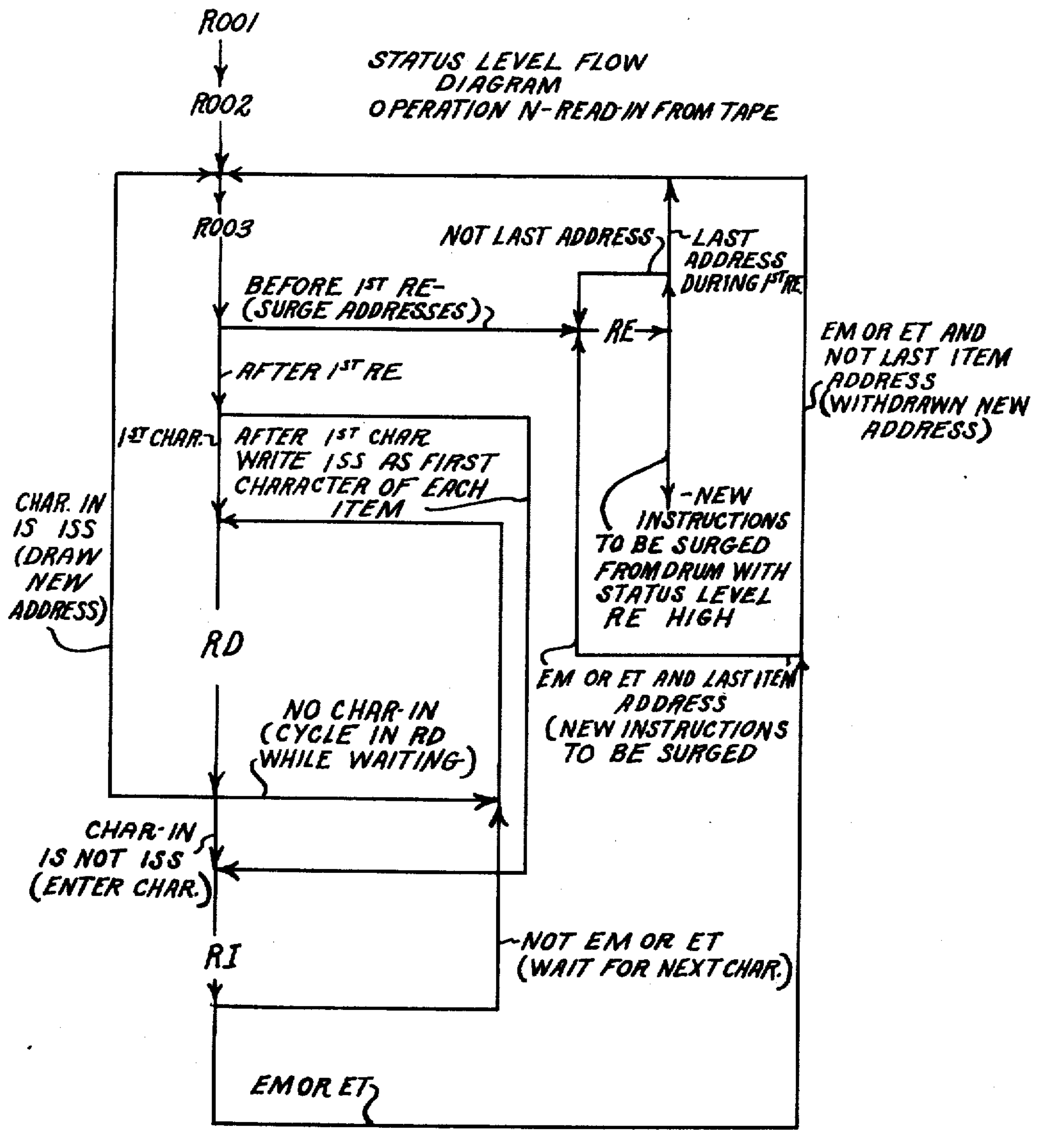

The foregoing and other objects, advantages, and novel features of the invention will be more fully apparent from the following description when read in connection with the accompanying drawing in which:

Figures 1 to 6 inclusive constitute a schematic diagram with the components in block form of so much of a computer embodying the invention as provides a clear understanding of the invention itself; and Figure 7 is a flow diagram of certain high status levels (a level being one of two bivalued voltages at a particular output).

2. DETAILED DESCRIPTION

2.1 *Description of circuits—Preliminary*

The present invention is embodied in a computer which is more fully described in a copending application entitled "Information Handling System," filed concurrently herewith by applicant, Lowell S. Bensky, Serial No. 478,021. It may be noted that the various components bear similar designations and the same reference numerals as the similar components in the drawing in the said Bensky application. The said Bensky application describes the computer in detail including various operations among which is an operation for reading-in from tape to the computer, which is involved here. The present application shows the computer in abbreviated form, including only so much as provides a clear and ready understanding of this invention.

Figure 4:
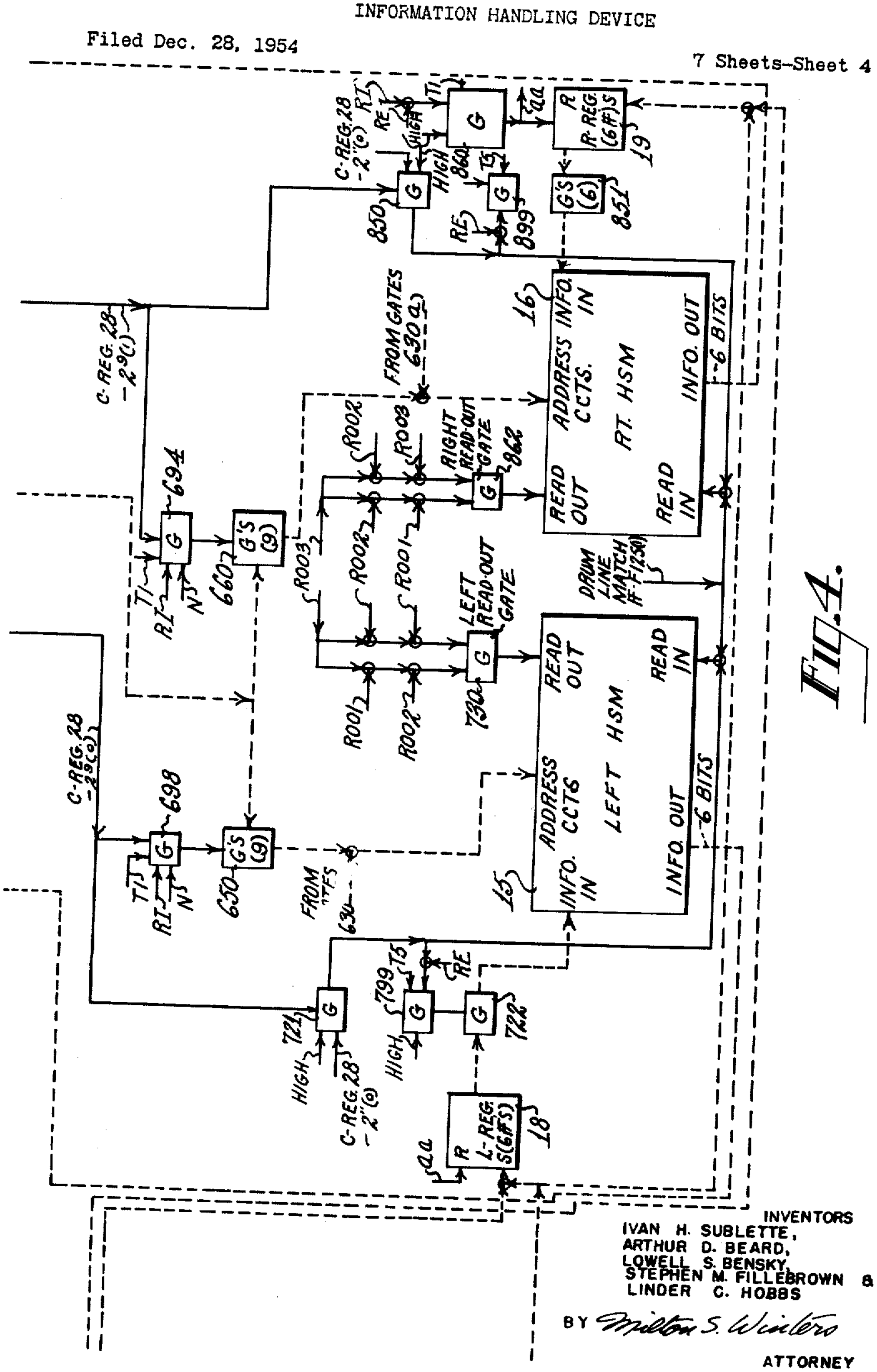

In this computer, the data upon which the computer acts may be stored in a static memory which, by way of example, may comprise two banks designated, respectively, the left high speed memory 15 and the right high speed memory 16 (see Fig. 4). Hereafter the abbreviation HSM is employed for high speed memory. Each memory bank may be of the type employing magnetic cores and may be assumed to include address circuits. Each memory bank also includes read-out and write-in circuits, which may be respectively actuated by pulses or high levels. On the occurrence of a pulse, at the appropriate circuit, the memory is placed in condition and thus receives information applied thereto at its information-in circuits or supplies information at its information-out circuits. The information in or out is in the form of binary digits of information or bits each represented by the level on one of several leads. Seven bits, in this instance, may be stored at each address, and written-in or read-out in parallel. However, one of these seven bits is a parity bit, and is ignored in describing the present invention. As will appear more fully hereinafter, a series of timing (that is, clock) pulses are provided in cycles of approximately twenty microseconds. It is assumed that the read-in and read-out circuits, although actuated, are further actuated internally only upon occurrence of a timing pulse designated T5. Information may be received or fed out of the memory throughout the period from timing pulse T5 to timing pulse T6. A memory of magnetic cores may be employed, or a vacuum tube memory, such as a selectron, for example, may be employed.

It may be noted that the employment of two banks of the memory and the use of other certain details involved are not essential to the invention described and claimed herein, but these details are shown and described by way of clear, explicit, and full example.

2.2 *Description of circuits of Fig. 1*

In a known manner, a program drum PD, Fig. 1, is supplied with a timing track and a reset track. The program drum PD is preferably a magnetic drum continuously rotated. As the drum rotates, pulses are generated in reading heads from the timing track in synchronism with lines of information written on the drum in the form of binary numbers magnetically stored in 12 data channels. With the occurrence of every other pulse from the timing track, the timing pulse generator generates a series of nine timing pulses designated as T1 to T8 and **T8*a*** respectively. The particular manner of generation of the timing pulses is shown more fully in the said copending Bensky application, and especially the manner whereby every alternate pulse from the timing track is suppressed. However, the latter feature although employed here and highly useful in providing greater compression of information on the drum, requires no further description for the purposes of describing the present invention. The reset track on the program drum PD provides a single fiducial pulse from which the lines on the drum are counted.

Six of the data channels on the program drum PD are read by six left reading heads and amplifiers 51, and the other six data channels are read by six right reading heads and amplifiers 52. A gate 150 receives the pulses from the reset track of the program drum PD and applies it to the reset terminal R of a drum counter DC. The gates herein are all logical "and" gates and are indicated by rectangles, with the priming leads directed toward the rectangle, and the output leaving the rectangle. The gate 150 is a two-input gate. In addition to the input from the reset track, another input is indicated which, for the purposes of the present application, may be considered always high, and the gate therefore always open. The drum counter DC may be a counter of nine stages. Each of the counters and registers herein may be flip-flop counters or registers. The trigger terminal T of the drum counter DC receives the output of an "or" circuit. This "or" circuit receives two inputs, one the first timing pulse T1 and the other the fifth timing pulse T5. In the drawing in this application, as in the Bensky application, a special convention is adopted for the showing of an "or" circuit. According to this convention, the inputs to the "or" circuit are indicated by arrowheads converging to a point which is the center of a small circle.

A program counter PC is provided having nine flip-flop stages. The outputs of the program counter PC are applied to inputs of an equal circuit 50, sometimes called the third equal circuit to distinguish it from two others in the computer of which the circuits shown here are a part. Other inputs of the third equal circuit 50 are from the flip-flop stages of the drum counter DC. A flip-flop is a circuit having two stable states, that is, conditions, and two input terminals, one of which may be designated as set and the other of which may be designated as reset. The flip-flop may assume the set condition by application of a high level, or pulse, on the set input terminal S or the reset condition by application of a high level, or a pulse, on a reset terminal R. Two outputs are associated with the flip-flop circuit which are given Boolean tags of "one" and "zero." If the flip-flop is in its set condition (that is, set), the one output voltage is high and the zero output voltage is low. Unless otherwise indicated, the outputs from flip-flops are taken from the "one" terminal. If the flip-flop is reset (that is, in its reset condition) the "one" terminal is low and the "zero" terminal is high. A flip-flop may also be provided with a trigger terminal T. Application of a pulse to the trigger terminal T causes the flip-flop to assume the other condition from the one it was in when the pulse was applied. Counters are formed from flip-flops in known manner.

In this application, multiple leads are indicated by dotted lines. Each of these multiple leads carries, as the machine operates, a binary digit of information having only two possible voltage levels one high and one low. Therefore, the lines themselves are sometimes designated as bits (binary digits of information).

The equal circuit 50 may comprise a group of "and" gates one for each pair of the corresponding leads from corresponding stages of the two counters, the program counter PC and the drum counter DC. The outputs of all of the "and" gates are also applied in pairs through "or" circuits to a single "and" gate. Accordingly, the equal circuit 50 has a pulse output if, and only if, the binary number in the program counter PC is the same as the binary number in the drum counter DC.

A "drum line match flip-flop" F125 receives at its set terminal S the output of the equal circuit 50. Note that a stylized double F is employed in the drawing to indicate flip-flop. A two-input gate 243 receives as one input the timing pulse T8 and as the other a status level RE. The output of the gate 243 is applied to the reset terminal R of the drum line match flip-flop F125.

Several status levels are provided. Only one status level is high at a time. The selection and provision of the various status levels will be described in greater detail hereinafter, in connection with Fig. 6. For the present, it is sufficient to note that among the status levels provided and of interest in the present application, are those designated as follows: R001; R002; R003; RD; RI; and RE.

The output from the drum line match flip-flop F125, that is, from the "one" terminal, is applied to a gate 142 and also to a gate 242. In this application, junctions between leads are indicated by an arrowhead at the junction which indicates the direction of signal or information flow. Each of the gates 142 and 242 is a two-input gate and receives as its second input the second timing pulse T2. It may be noted that the gates 142 and 242 provide the same output, and their function could be combined in one gate. Such a combination could also be made in other instances. The output of the gate 142 is applied to both the left and right reading heads and amplifiers 51 and 52 and may be considered to control or gate the outputs of the reading heads and amplifiers. The output of the gate 242 is applied through an "or" circuit to the trigger terminal T of a seven stage counter designated the program subcounter PSC. A two-input gate 244 also has its output applied through the last-mentioned "or" circuit to the trigger terminal T of the program subcounter PSC. The gate 244 receives as one input the output of a three-input "or" circuit, the three inputs of which are, respectively, the status levels R001, R002, R003. The second input to the gate 244 is the second timing pulse T2. A set of six two-input "and" gates 630 are provided and a second set of six two-input "and" gates 630a are provided. Each gate of each set of gates 630 and 630a receives one input from the output of a two-input "and" gate 629. Each of the gates 630 receives a second input from a respective one of the six outputs from the program subcounter PSC. Also, each of the six gates 630a receives one input from a different output of the six stages of the program subcounter PSC. Thus, note that between the gates 630 and 630a, the output leads from the program subcounter PSC are indicated as branched (by the convention already described of an arrowhead at the junction), a similar convention being employed for multiple leads as shown here. One input to the gate 629 is from the first timing pulse T1. The second input to the gate 629 is at the output of various "or" circuits the inputs to which are the status levels R001, R002, R003, and RE.

Figure 2:
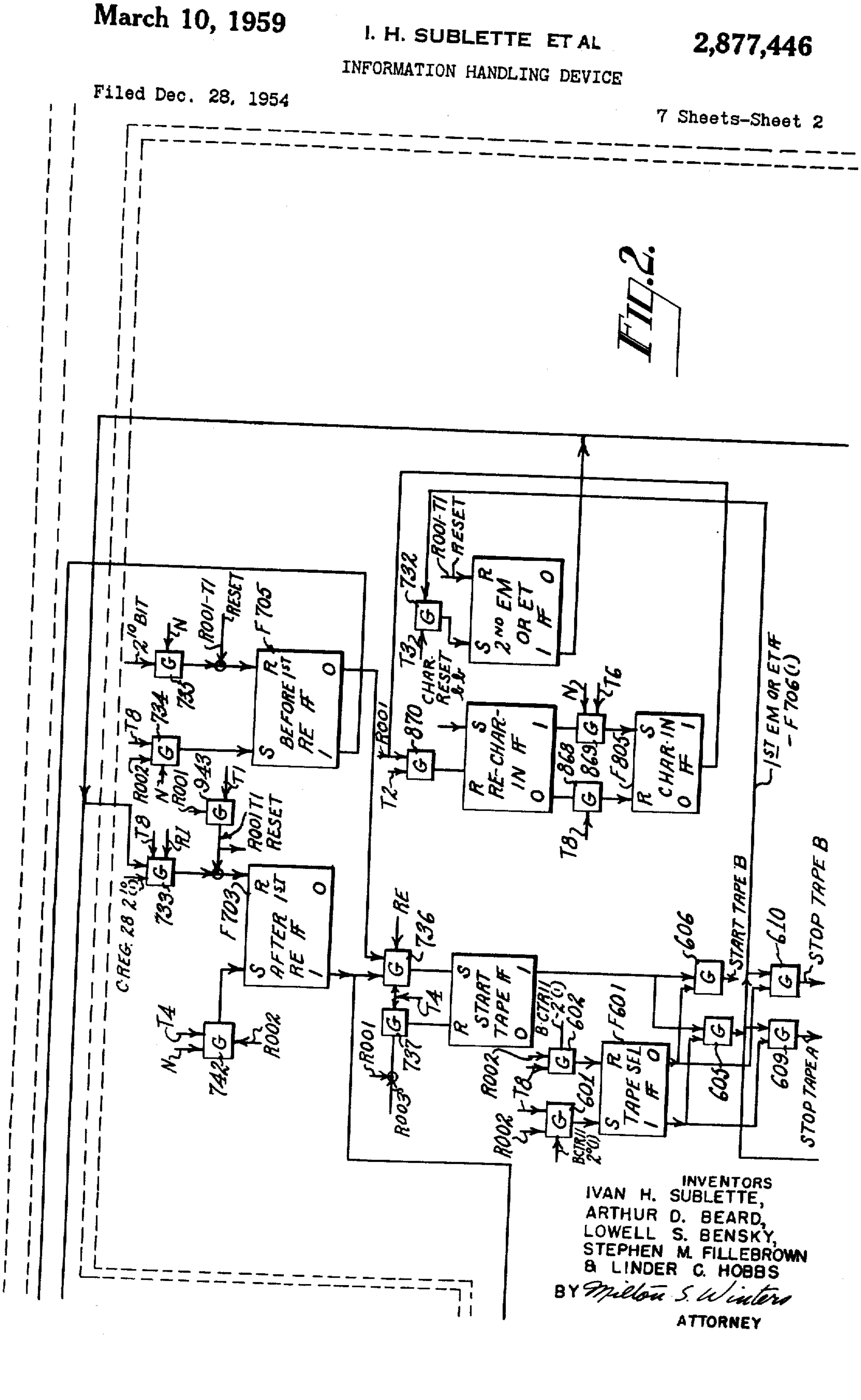

The various set terminals S of the program counter PC are connected to receive the outputs of a set of twelve gates 102 and also a set of twelve gates 115. The gates 102 are primed by the output of a gate 101 having five inputs. A first input to the gate 101 is from an "or" circuit having two inputs one from the status level RI and one from the status level R003. A second input to the gate 101 is from the "one" terminal of the eleventh order stage or flip-flop (designated as the $2^{10}$ bit) flip-flop. This terminal may be designated as C register $28\text{–}2^{10}(1)$. A similar way of indicating the output from only one stage of counters or registers is employed throughout, and is readily understood in the art. The third and fourth inputs to the gate 101 come from the "one" terminal of a "second EM or ET" flip-flop F702, the "one" in parentheses on the drawing (thus: (1)) again indicaing that the output is take from the "one" terminal. This second EM or ET flip-flop F702 is shown in Fig. 2 and described more fully hereinafter. The fifth input to the gate 101 is from the eighth timing pulse T8.

One input to each of the twelve gates 115 is from a gate 114 having five inputs. One input to the gate 114 is from the status level R003. A second input may be taken as high throughout the present operation and is indicated by the legend "high." A third input to the gate 114 is from the "one" output terminal of a "before first RE" flip-flop F705. The last-mentioned flip-flop is shown in Fig. 2 and more fully described in connection therewith. A fourth input to the gate 114 is from the operation level N. The fifth input to the gate 114 is the eighth timing pulse T8. The second input to each of nine of the gates 102 is received from an A register 26 of Fig. 3 and to each of the other three of the gates 102 from a B counter 11 of Fig. 3 as will be more fully described hereinafter.

A gate 239 has three inputs, one of which is received from the "one" terminal of the before first RE flip-flop F705. A second input to the gate 239 is from the status level R003. The third input to the gate 239 is the seventh timing pulse T7. The output of the gate 239 is applied through an "or" circuit to the reset terminal R (connected to all the reset terminals of all stages, but shown as one terminal, as is uniformly indicated for the counters or registers throughout this application) of the program counter PC. The output of the gate 239 is also applied to the reset terminals R of the program subcounter PSC through an "or" circuit.

A three-input gate 241 has its output applied through an "or" circuit as shown to the reset terminals R of the program subcounter PSC. One input to the gate 241 is from an "After first RE" flip-flop F703 shown in Fig. 2 and more fully described hereinafter. A second input to the gate 241 is from the status level RE. A third input to the gate 241 is from the eighth delayed timing pulse **T8*a***.

2.3 *Description of circuits of Fig. 2*

Reference is made to Fig. 2, which is to be placed immediately to the right of Fig. 1, so that the lines from one figure to the other register and are continuous.

The before first RE flip-flop F705 receives at its set terminal S the output of a gate 734 having three inputs. One input to the gate 734 is from the operation level N, to be described more fully hereinafter. A second input is from the status level R002. The third input is from the eighth timing pulse T8. A gate 735 has two inputs, one of which is the said operation level N. The second input to the gate 735 is from one of the outputs of the left reading heads and amplifiers 51 of Fig. 1, designated "$2^{10}$ bit." Twelve outputs occur simultaneously from the left and right reading heads and amplifiers 51 and 52 of Fig. 1. These twelve bits are related to the digits of a twelve digit binary number. The eleventh order digit, designated as the $2^{10}$ bit, is applied as the second input to the gate 735, for a reason which will appear more fully hereinafter, and having to do with the recognition of the last address available. The after first RE flip-flop F703 receives at its set terminal S the output of a three-input gate 742. One input of the gate 742 is from the status level R002, a second is from the operation level N, and the third is the fourth timing pulse T4. A four-input gate 733 receives at one input the status level RI, at a second input the output from the "one" terminal of the second EM or ET flip-flop F702, and at a third input the eighth timing pulse T8. The fourth input to the gate 733 is from the "one" output terminal of the $2^{10}$ flip-flop of the C register 28. The output of the gate 733 is applied through an "or" circuit, as shown, to the reset terminal R of the after first RE flip-flop F703. A gate 943 provides an output designated R001–T1 reset which is applied through the last-mentioned "or" circuit to the reset terminal R of the after first RE flip-flop F703. The gate 943 has two inputs, one of which is the status level R001 and the other of which is the first timing pulse T1.

A four-input gate 736 receives one input from the

"one" terminal of the after first RE flip-flop F703, a second input from the "zero" terminal of the before first RE flip-flop F705, a third input from the status level RE, and the fourth input from the fourth timing pulse T4. The output of the gate 736 is applied to the set terminal S of a start tape flip-flop F704. A two-input gate 737 has its output applied to the reset terminal R of the start tape flip-flop F704. One input to the gate 737 is from an "or" circuit to which are applied the two status levels R001 and R003. The second input to the gate 737 is from the fourth timing pulse T4.

A tape selector flip-flop F601 receives at its set terminal S the output of a gate 601 and at its reset terminal R the output of a gate 602. The gates 601 and 602 are each three-input gates. One input to each of the gates 601 and 602 is the status level R002, and a second input to each of the gates 601 and 602 is the eighth timing pulse T8. The third input to the gate 601 is the "one" output terminal of the lowest order, that is, $2^0$ bit flip-flop, of the B counter 11, described more fully in connection with Fig. 3. The third input to the gate 602 of Fig. 2 is from the "one" output terminal of the second order stage, indicated as the $2^1$ bit flip-flop, of the B counter 11. Each of the three inputs to the gates 601 and 602 is indicated by legend in accordance with the convention already mentioned.

A pair of two-input, start tape gates 605 and 606 and a pair of two-input, stop tape gates 609 and 610 are provided. Each of the start tape gates receives one input from the "one" output terminal of a "start tape" flip-flop F704. The second input to the start tape gate 605 is from the "one" output terminal of the tape selector flip-flop F601, and the second input to the start tape gate 606 is from the "zero" terminal of the tape selector flip-flop F601. The stop tape gates 609 and 610 each receive one input from a first EM or ET flip-flop F706, to be described more fully hereinafter in connection with Fig. 5. The second input to the gate 609 is from the "one" output terminal of the tape selector flip-flop F601, and the second input to the stop tape gate 610 is from the "zero" output terminal of the tape selector flip-flop F601. The outputs of the start tape gates 605 and 606 are applied respectively to circuits which control the start tape mechanisms for tapes A and B, as indicated by legend on the drawing. The outputs of the stop tape gates 609 and 610 are applied respectively to circuits which controls the mechanisms for stopping tapes A and B, respectively, as indicated by legend. It is assumed that enough space is allowed between the end of one message on a tape and the start of the succeeding message, to accommodate the start and stop times of the tape and the tape circuits.

The second EM or ET flip-flop F702 mentioned hereinbefore receives at its set terminal S the output of a two-input gate 732. One input of the two-input gate 732 is from the "one" output terminal of the first EM or ET flip-flop F706 of Fig. 5. The second input to the gate 732 is the third timing pulse T3. The reset terminal R of the second EM or ET flip-flop F702 receives the output of the gate 943 designated R001–T1 reset.

A "pre-character-in" flip-flop F806 receives at its reset terminal R the output of a two-input gate 870. One input of the gate 870 is from an "or" circuit receiving the status level R001 and also the "one" output terminal of a "character-in" flip-flop F805 to be described shortly. The second input of the gate 870 is the second timing pulse T2. The set terminal S of the pre-character-in flip-flop F806 receives the output of certain input tape character present circuits to be described in connection with Fig. 5, the last-mentioned output being designated as *bb*. A pair of two-input gates 868 and 869 receive as one input respectively the "zero" output and the "one" output of the pre-character-in flip-flop F806. The second input to the gate 868 is the eighth timing pulse T8. The second input to the gate 869 is the sixth timing pulse T6.

Figure 3:
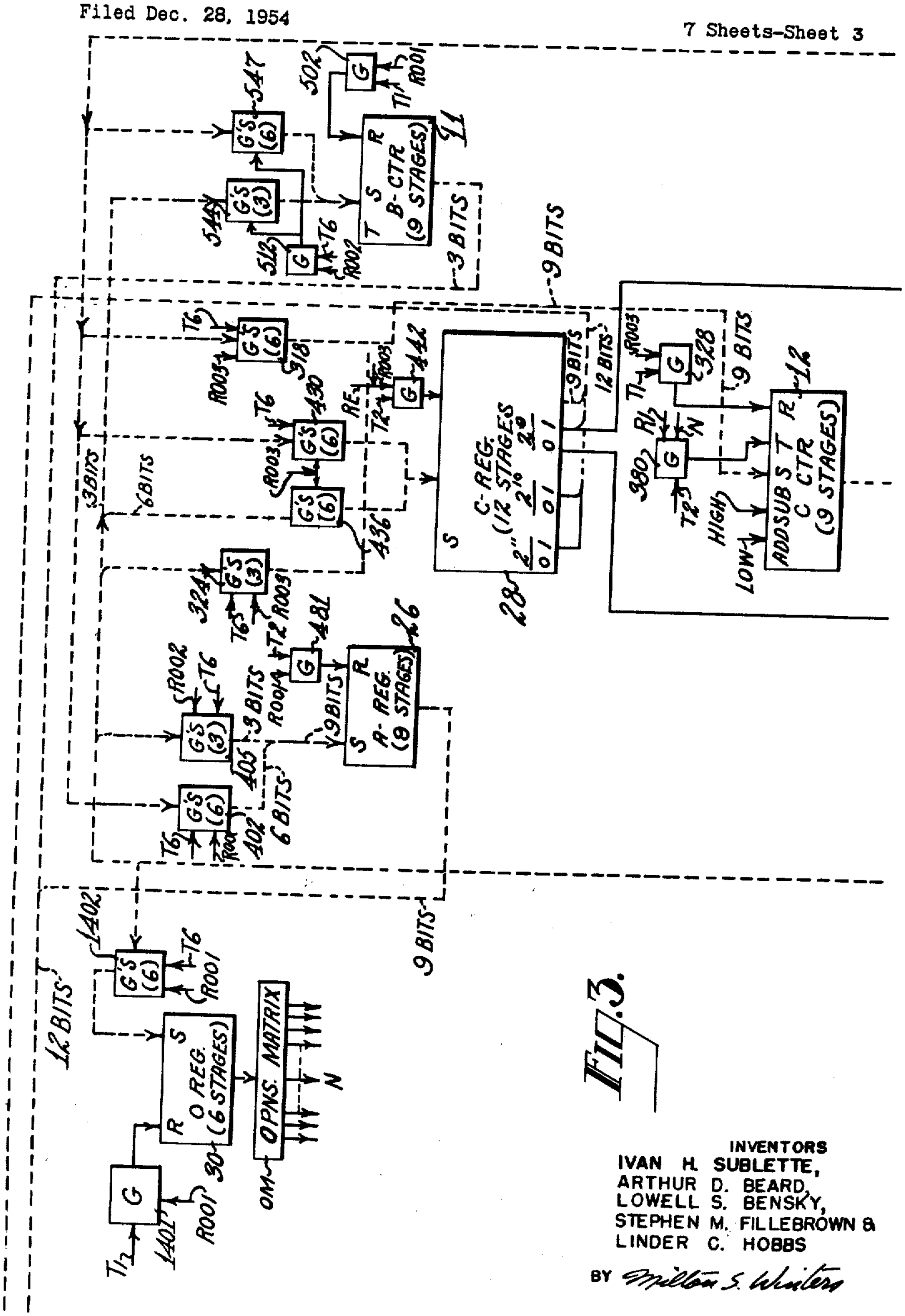

2.4 *Description of circuits of Fig. 3*

Reference is made to Fig. 3, which is to be placed immediately to the right of and adjacent to Fig. 2, so that the lines from Fig. 2 to Fig. 3 register and are continuous.

An O register 30 of six stages is provided. The different outputs of the O register 30 are connected to control an operations matrix OM. The reset terminals R of the O register 30 receive the output of a two-input gate 1401. One input to the gate 1401 is from the status level R001 and the other input is the first timing pulse T1. The set terminals S of the O register 30 are connected to receive the various outputs of a set of six gates 1402, each of which is a three-input gate. One input to each of the gates 1402 is the status level R001, and a second input to each of the gates 1402 is the sixth timing pulse T6. The third input to the gates 1402 is received from the various outputs of the left HSM 15. The operations matrix OM is a matrix which selects a different output lead to be high depending on the six bits entered into the O register 30. The output of the operations matrix of interest in the present application is indicated as an operation level N. The other outputs of the operations matrix OM are of interest with respect to other operations which the entire computer may perform. The operations matrix OM therefore selects the operation to be performed by the computer in response to a coded input to the O register 30, which input may be withdrawn from the memory HSM 15, 16, as described hereinafter.

An A register 26 of nine stages is provided. The reset terminals R of the A register 26 receive the output of a two-input gate 481. One input of the gate 481 is the status level R001 and the other input is the second timing pulse T2. Six of the set terminals S of the A register 26 receive the outputs of a set of six, three-input gates 402. One input to each of the gates 402 is from the status level R001 and a second input is the sixth timing pulse T6. The third input to the six gates 402 is from the respective six outputs of the right HSM 16 of Fig. 4. The other three terminals S of the A register 26 receive respectively the outputs of a set of three, three-input gates 405. One of the inputs to the gates 405 is the status level R002, and a second input to each of the gates 405 is the sixth timing pulse T6. The remaining, third input to the gates 405 is, respectively, from three of the six bits of output of the left HSM 15.

The other three bits of output from the left HSM 15 are applied respectively to the three gates of a set of three, two-input gates 544. Three of the set terminals S of a B counter 11 receive respectively the three outputs of the gates 544. The set terminals S of the other six, lowest order stages of the B counter 11 receive respectively the six outputs of a set of six, two-input gates 547. The gates 547 receive one input respectively from each of the six outputs of the right HSM 16. The second input to each of the gates 544 and to each of the gates 547 is from the output of a two-input gate 512. One input to the gate 512 is from the status level R002, and the other input to the gate 512 is from the sixth timing pulse T6.

A twelve stage C register 28 and a nine stage C counter 12 are provided. The six lowest order stages of the C counter 12 have their respective set terminals S connected to receive the outputs of a set of six two-input gates 318. The set terminals S of the six lowest order stages of the C register 28 are connected to receive the outputs of a set of six, three-input gates 430. Each gate of the sets of gates 318 and 430 receives as one input the status level R003, and as its second input the sixth timing pulse T6. Each gate of the set of six gates 318 receives as its third input the six outputs of the right HSM 16 respectively, and the six gates 430 receive respectively as their third inputs the same, last-mentioned six outputs, respectively, of the right HSM 16. The remaining three set terminals S of the C counter 12 are connected to receive respectively the outputs of a set of three, three-input gates 324. The gates 324 have as one input the status level R003 and as a second input the sixth timing pulse T6. The third input to the gates 324 is from the respective three lowest order outputs of the left HSM 15. These three outputs of the left HSM 15 are applied respectively to three of a set of six, three-input gates 436. The remaining three outputs of the left HSM 15 are applied to the other three gates of the six gates 436, and these latter three gates have their output terminals connected respectively to the set terminals S of the three highest order stages of the C register 28. The other three outputs of the set of six gates 436 are connected to the remaining set terminals S respectively of the remaining three stages of the C register 28. The other two inputs to each of the gates 436 are respectively the status level R003 and the sixth timing pulse T6.

Although the outputs from the memory banks apparently are read into many places at once, in fact these outputs are distributed during the different status levels. However, note, for example, that the entry to the nine lowest order stages of the C register 28 is the same, and made at the same time, as that to the nine stages, the C counter 12, and from the same memory outputs.

The reset terminals R of the C register 28 are connected to receive the output of a two-input gate 442, one input of which is the second timing pulse T2. The second input to the gate 442 is the output of an "or" circuit having as one input the status level RE and as another input the status level R003. The reset terminals R of the B counter 11 are connected to receive the output of a two-input gate 502 having as one input the status level R001 and as a second input the first timing pulse T1. The reset terminals R of the C counter 12 are connected to receive the output of a two-input gate 328 having as one input the status level R003 and as the other input the first timing pulse T1. As described more fully in the said copending Bensky application, the C counter 12 is a true counter, made up of flip-flops, and is reversible. However, for the purposes of the present application it may be assumed that the C counter 12 is always in its subtractive state and counts down. So far as the present application is concerned, however, the counter could just as well count up. The reason for having the counter count down, is that the items are written on to and read off from the tape in the present computer as though reading from left to right in ordinary English. For numerical work, therefore, the items are effectively entered in the computer at memory spaces numbered from the highest number. If the order of reading in items were reversed, it would be more convenient to have this counter count up during read-in or, alternatively, to reverse the manner in which the items are read out for computation.

The trigger terminal T of the lowest order stage (designated $2^0$) of the C counter 12 is connected to receive the output of a three-input gate 380. One input of the gate 380 is the status level RI, and a second input is the operation level N, and the third input is the second timing pulse T2.

The B counter 11, so far as the present application is concerned, is used only for its $2^0$ bit flip-flop and its $2^1$ bit flip-flop. Even one of these could be dispensed with, the state of one flip-flop being used, the "zero" output thereof being employed instead of the "one" output of the redundant flip-flop. However, the extra flip-flops allow for expansion, as for adding further tapes.

2.5 *Description of circuits of Fig. 4*

Reference is made to Fig. 4, which is to be placed immediately below Fig. 3 so that the lines from one figure to the other register and are continuous.

The portions of Fig. 4 on the left hand of the figure and on the right hand of the figure are nearly symmetrical, that is, the circuits are similar and perform similar functions. Therefore, only the left hand portion of the figure is described in detail, and the corresponding parts together with any differences in the connections is pointed out thereafter.

The left HSM 15 receives as inputs to its address circuits nine outputs of a set of nine, two-input gates 650 through "or" circuits. The other inputs to the "or" circuits are respectively from the gates 630. One input to each of the gates 650 is from a four-input gate 698 having as one input the status level RI, as a second input the operation level N, as a third input the first timing pulse T1, and as the fourth input the "zero" output terminal of the $2^8$ bit flip-flop of the C register 28. The second input to the gates 650 is received respectively from the nine "one" output terminals of the C counter 12 of Fig. 3.

The six bit input to the left HSM 15 "information-in" circuits is received from the six outputs of a set of two-input gates 722. One input to each of the gates 722 is from the output of a three-input gate 799. One input of the gate 799, is, for the purposes of the present application, at a high level. A second input to the gate 799 is the fifth timing pulse T5. The third input to the gate 799 is from an "or" circuit having as one input the status level RE, and as another input the output of a three-input gate 721. The output of the three-input gate 721 is also applied to activate the "write-in" circuits of the left HSM 15. One input of the gate 721 may be taken as always high for the purposes of the present application, so that the gate 721 may be taken as always primed thereby. A second input to the gate 721 is from the "zero" output of the C register 28 of Fig. 3. The third input to the gate 721 is from the "zero" output terminal of the $2^8$ bit flip-flop of the C register 28 (Fig. 3).

The gates 722 of Fig. 4 receive their second inputs respectively from the six outputs of an L register 18. The six outputs of the six, left reading heads and amplifiers 51 of Fig. 1 are applied through "or" circuits to the six set terminals S, respectively, of the L register 18. The six outputs from a set of four gates 821 and a set of two gates 825 are also applied through the last mentioned "or" circuits to the set terminals S respectively of the L register 18. The gates 821 and 825 are found on Fig. 5 and will be more particularly described hereinafter.

The left HSM 15 "write-in" circuits are also activated by the "one" output terminal of the drum line match flip-flop F125 of Fig. 1 applied through an "or" circuit. The read-out circuits of the left HSM 15 are activated by the output of a left read-out gate 730. The left read-out gate is a two-input gate, for reasons having to do with other operations of the computer. So far as the present application is concerned, each of the two inputs of the left read-out gate 730 receives, through "or" circuits, the status levels R001, R002 and R003. In other words, the left read-out gate 730 has a high output whenever any one of the status levels R001, R002, and R003 is high.

The components of the right hand portion of Fig. 4 corresponding to those of the left hand portion are as follows: The right HSM 16 corresponds to the left HSM 15; the R register 19 corresponds to the L register 18, however, the set terminals S of the R register 19 receive the outputs of the right reading heads and amplifiers 52 of Fig. 1 through the "or" circuits; the gates 660 correspond to the gates 650; the gate 694 corresponds to the gate 698, however, the fourth input to the gate 694 is from the "one" terminal of the $2^8$ bit flip-flop of the C register 28 of Fig. 3 rather than from the "zero" terminal of that flip-flop as for the gate 698; the gates 851 correspond to the gates 722; the gate 899 corresponds to the gate 799; the gate 850 corresponds to the gate 721, however, gate 850 receives an output from the "one" terminal, rather than the "zero" terminal, of the $2^8$ bit flip-flop of the C register 28, and the gate 862 corresponds to the gate 730.

In addition, a three-input gate 860 is provided having an output which is applied to the reset terminals R of both the L register 18 and the R register 19. This last-mentioned output is designated *aa*. The gate 860 has one input which may be taken for the purposes of the present application as always high. A second input to the gate 860 is the first timing pulse T1. The third input to the gate 860 is from either one of the status levels RE or RI which is high, applied through a suitable "or" circuit as shown.

2.6 *Description of circuits of Fig. 5*

Reference is made to Fig. 5, which is to be placed immediately below Fig. 2 and to the left of Fig. 4, so that lines from one figure to another register and are continuous.

A Y register 13 of six stages is provided. The set terminals S of the Y register 13 receive the six outputs of a set of "or" circuits R904. Each of the "or" circuits R904 receives a different one of the six inputs from the six reading heads for the input tape A and receives as a second input a different one of the outputs from the reading heads associated with the second input tape B. The outputs of the "or" circuits R904 are also applied to a single "or" circuit 66 having six inputs and designated as the "input tape character-present" circuit. The output of the input tape character-present circuit 66 indicated as *bb* is applied to the set terminal S of the pre-character-in flip-flop F806 of Fig. 2, as mentioned hereinbefore. The reset terminals R of the Y register 13 of Fig. 5 receive the output of a three-input gate 901. One input of the gate 901 is the fourth timing pulse T4. A second input of the gate 901 is from the output of an "or" circuit to which is applied the operation level N so far as here pertinent. The third input to the gate 901 is from an "or" circuit having as one input the status level R001 and as another the status level RI.

A set of four, three-input gates 821 are provided to which are applied, respectively, as one input four outputs from four of the Y register 13 stages corresponding to the four lowest order bits in the Y register 13. A pair of two-input gates 825 are provided to which the remaining two outputs corresponding to the other two bits of the Y register 13 are applied. The third input to each of the gates 821 and the second input to each of the gates 825 is from the output of a three-input gate 820. One input to the gate 820 is from the status level RI, a second input to the gate 820 is from the operation level N. The third input to the gate 820 is from the second timing pulse T2. It may be noted here that the gates 821 and 825 are separated for purposes having to do with reading in negative items from the tape in complemented form. If further details (not necessary to understand the present invention) with respect to thus reading in negative items from the tape are desired, these details may be found in the said copending Bensky application.

The six outputs from the Y register 13 are also applied to certain symbol recognition circuits 23. These symbol recognition circuits may include a circuit designated "recognize NOT ISS" and having an output lead indicated as NOT ISS. The NOT ISS lead is at a high level if, and only if, the input to the "recognize NOT ISS" circuits is NOT a coded item separation symbol. The NOT ISS lead is applied to an inverter I11, and the output of the inverter is designated ISS. Accordingly, the ISS output lead is high if, and only if, the input to the "recognize NOT ISS" circuit (that is, the output of the Y register 13) is a coded item separation symbol.

The symbol recognition circuits 23 also include two sets of logical "or" circuits designated respectively EM circuits R920 and ET circuits R921. The logical "or" circuits are arranged so that the EM circuits R920 provide an output high if, and only if, their inputs, from the Y register 13, is a coded "end message" symbol. The ET circuits R920 provide an output which is high if, and only if, their inputs from the outputs of the Y register 13, is a coded symbol indicating that the end of the current run of items on the tape has been reached. The symbol ET does not necessarily indicate the physical end of the type, although it may do so. The output of the EM circuits R920 is applied as one input of a three-input gate 485. A second input of the gate 485 is the operation level N. The third input of the gate 485 is from the output of a three-input gate 942. One input to the gate 942 is the operation level N, a second input is the status level RI, and the third input is the first timing pulse T1.

The output of the EM circuits R920 is also applied together with the output of the ET circuits R921 as inputs to an "or" circuit, the output of which latter "or" circuit is applied as one input of a two-input gate 740. The other input of the gate 740 is from the output of the gate 942.

The output of the gate 740 is applied to the set terminal S of the first EM or ET flip-flop F706, mentioned hereinbefore. As pointed out hereinbefore, the "one" output terminal of the first EM or ET flip-flop F706 is applied to the stop tape gates 609 and 610 of Fig. 2, and to the gate 732 of Fig. 2 which has its output applied to the set terminal S of the second EM or ET flip-flop F702 of Fig. 2. A two-input gate 741 of Fig. 5 has an output applied to the reset terminal R of the first EM or ET flip-flop F706. One input of the gate 741 is the status level R003, and the other input is the first timing pulse T1.

A three-input gate 859 receives one input from the status level RI, and a second input from the second timing pulse T2. The third input to the gate 859 is from the "one" output terminal of the second EM or ET flip-flop F702 of Fig. 2, as mentioned hereinbefore. The output of the gate 859, Fig. 5, is connected directly to certain leads of the six leads applied to the set terminals S of the L and R registers 18 and 19 from the gates 821 and 825. These particular leads are those which must have a high level to provide a coded item separation symbol. The item separation symbol as a binary number may be coded as 111100. Hence the output of the gate 859 is applied to the leads carrying the $2^2$ to $2^5$ bits, inclusive.

2.7 *Description of circuits of Fig. 6*

With reference to Fig. 6, the six status levels concerned with the present operation of reading on from tape are indicated in Fig. 6 as RE, RI, RD, R003, R002, and R001. These six leads are, respectively, the "one" output terminals of a set of flip-flops F1283, F1284 and F1289 to F1293, inclusive, which are designated the status level control flip-flops 47. These status levels, or leads, are not carried continuously to the other figures, but are indicated throughout by their appropriate reference letters. The set terminals S of the status level control flip-flops 47 are connected to receive, respectively, as itemized above, the outputs of delay circuits D1283, D1284 and D1289 to D1293 inclusive. The inputs of these delay circuits are connected to receive the outputs respectively of amplifiers A1283, A1284, and A1289 to A1293 inclusive. The inputs to these amplifiers, last-mentioned, are designated respectively as the "set RE" lead, the "set RD" lead, the "set RI" lead, the "set R003" lead, the "set R002" lead, and the "set R001" lead. The outputs of the amplifiers A1283, A1284 and A1289 to A1293 inclusive are applied through a series of "or" circuits to an amplifier A1299, the output of which is applied to the reset terminals R of the various status level control flip-flops 47.

A three-input gate 1278 is provided having its output applied to the "set R001" lead. One input to the gate 1278 is from a status level IC, not otherwise shown herein than in connection with the gate 1278. The status level IC may be assumed high upon the completion of the last instruction before the current instruction for the operation N is to be withdrawn. If further details regarding the status level IC and those other status levels for this particular machine which are not shown in this application, such details may be found in the said copending Bensky application. The second input to the gate 1278 is from a lead indicated as "NOT END." The "NOT END" lead is from a switch circuit shown in the said copending Bensky application and may be assumed high because at least one instruction, namely the instruction for operation N, about to be withdrawn, remains to be performed.

A four-input gate 1277 has as one input the status level RE, as a second input the output from the "zero" output terminal of the after first RE flip-flop F703 of Fig. 2, as a third input an "END" lead, explained more fully hereinafter, and as the fourth input the eighth delayed timing pulse T8*a*. The "END" lead mentioned is high when the "NOT END" lead is low, and vice-versa. In other words, when the program subcounter PSC reaches a predetermined count, the "END" lead is high and at any other time, the "NOT END" lead is high. The third input to the gate 1278 is the eighth delayed timing pulse T8*a*.

A two-input gate 1280 has as one input the status level R001 and as a second input the eighth delayed timing pulse T8*a*. The output of the gate 1280 is applied to the "set R002 lead."

A four-input gate 1272 is provided having as one input the ISS lead, as a second input the status level RD, as a third input the "one" output terminal of the character-in flip-flop F805 of Fig. 2, and as the fourth input the eighth delayed timing pulse T8*a*. A two-input gate 1273 has as one input the status level RI and as a second input the eighth delayed timing pulse T8*a*. A five-input gate 1274 has as one input the status level RE, as a second input the operation level N, as a third input the "zero" output terminal of the "before first RE" flip-flop F705, as a fourth input the "zero" output terminal of the second EM or ET flip-flop F702, and as the fifth input the eighth delayed timing pulse T8*a*. A two-input gate 1275 has as one input the status level R002, and as the second input the eighth delayed timing pulse T8*a*. The outputs of the four gates 1272 to 1275, inclusive, are applied through "or" circuits to the set R003 lead.

A three-input status transition gate 1228 has as one input the operation level N, as a second input the status level RI, and as the third input the eighth delayed timing pulse T8*a*.

A six-input status transition gate 1229 has as one input the "NOT ISS" lead, as a second input the "zero" output terminal of the second EM or ET flip-flop F702 of Fig. 2, as a third input the "zero" output of the "before first RE" flip-flop F705 of Fig. 2, as a fourth input the status level R003, as a fifth input the operation level N, and as the sixth input the eighth delayed timing pulse T8*a*. The outputs of the gates 1228 and 1229 are applied through "or" circuits to the set RD lead.

A four-input gate 1253 receives as one input the "one" output terminal of the character-in flip-flop F805 of Fig. 2, as a second input the output from the "NOT ISS" lead (from Fig. 5), as a third input the status level RD, and as a fourth input the eighth delayed timing pulse T8*a*. A five-input gate 1254 receives one input from the "zero" output terminal of the "before first RE" flip-flop F705 of Fig. 2, a second input from the ISS lead of Fig. 5, a third input from the status level R003, a fourth input from the operation level N, and the fifth input from the eighth delayed timing pulse T8*a*. The outputs from the gates 1253 and 1254 are applied through an "or" circuit to the "set RI" lead.

A two-input gate 1218 receives one input from the "one" output terminal of the $2^{10}$ bit flip-flop of the C register 28 of Fig. 3, and the second input from the "one"

output terminal of the second EM or ET flip-flop F702 of Fig. 2. A four-input gate 1219 receives one input from the "one" output terminal of the "before first RE" flip-flop F705 of Fig. 2, a second input from the status level R003, a third input from the operation level N, and the fourth input from the eighth delayed timing pulse T8a. The outputs of the gates 1218 and 1219 are applied through "or" circuits to the "set RE" lead.

3. MACHINE OPERATION

In this machine, the instructions are stored in a surge tank section of the HSM 15, 16 as described, for example, in a patent to Bensky et al. 2,679,638. It may be assumed that the preceding instruction withdrawn from the HSM 15, 16 has been performed by the machine, and that the current instruction, to write in from tape (operation N) is now to be withdrawn from the surge tank. Note that the status level IC is presumed to be high and also the "NOT END" lead is presumed to be high. Therefore, the gate 1278 of Fig. 6 passes the eighth delayed timing pulse T8a to the set R001 lead. The pulse thus passed is amplified by the amplifiers A1293 and A1299 and resets all of the status level control flip-flops 47. After a delay in the delay circuit D1293, the status level control flip-flop F1293 is set and the status level R001 is high.

3.1 *Staticizing instruction*

3.1.1 *Status level R001 high*

T1

The first timing pulse T1 is passed through the gate 943 to provide a pulse R001–T1 reset (of Fig. 2). The "before first RE" flip-flop F705; and the "after first RE" flip-flop F703; the second EM or ET flip-flop F702 (all of Fig. 2) are all reset. The first timing pulse T1 passes through the gate 1401 (Fig. 3) to reset the O register 30 (Fig. 3).

The B counter 11 of Fig. 3 is reset by the first timing pulse T1 passed through the gate 502.

The program subcounter PSC of Fig. 1 may be assumed to have a count corresponding to an address in the surge tank section of the memory corresponding to the instruction (to perform operation N read-in from tape) about to be read out. The gate 629 applies this count through the gates 630 and gates 630a to the respective address circuits of the left and right HSM 15 and 16.

T2

The pre-character-in flip-flop F806 of Fig. 2 is reset by the second timing pulse T2 from the gate 870. The program subcounter PSC (Fig. 1) is advanced by one count by the second timing pulse T2 passed through the gate 244. Note that the gates 630 and 630a have been closed before the program subcounter PSC count was advanced. The second timing pulse T2 is passed through the gate 481 (Fig. 3) to reset the A register 26.

T4

The start tape flip-flop F704 (Fig. 2) is reset by the fourth timing pulse T4 from the gate 737.

T6

The left and right read-out gates 730 and 862 have high outputs because of the high status level R001 to activate the read-out circuits of the left and right HSM 15 and 16. The information out of the left HSM 15 and the right HSM 16 now becomes available during the fifth and sixth timing pulses T5 and T6 from the location addressed during the next preceding occurrence of the timing pulse T1. The six bits from the output of the left HSM 15 of Fig. 4 are now passed through the gates 1402 of Fig. 3 to the O register 30 of Fig. 3. The six bits from the right HSM 16 of Fig. 4 are passed through the gates 402 (Fig. 3) to be entered in the six highest order stages of the A register 26 (Fig. 3). As soon as the O register 30 has received the six bits thus applied to it, which are here presumed to be coded for the operations matrix OM to select the operation level N, the operation level N is high, and all the other operation levels are low.

T8

The character-in flip-flop F805 (Fig. 2) is reset by the eighth timing pulse T8 passed through the gate 868, the latter being primed by the "zero" output terminal of the pre-character-in flip-flop F806 which was reset at the next preceding second timing pulse T2.

T8a

The status transition gate 1280 (Fig. 6) passes the eighth delayed timing pulse T8a to the "set R002" lead. In a manner similar to that in which the status level R001 was selected to be high, the status level R002 is now selected to be high. Because of the similarity, in the manner in which the different status levels are selected, i. e. passing of the eighth delayed pulse to an appropriate "set" lead, followed by resetting all of the status level control flip-flops 47, and thereafter applying the delayed pulse from the appropriate "set" lead to the appropriate one of the status level control flip-flops 47 to set the selected flip-flop and cause the selected status level to be high, and in view of the preceding description, no further description of this selection is believed necessary. Further, it is believed unnecessary to describe in detail the selection of the other status levels. The status level R002 is now high.

3.1.2 *Status level R002 high*

T1

The gates 630 and 630a (Fig. 1) are again opened by the first timing pulse T1 passed through the gate 629. The address circuits of the left and right HSM 15 and 16 (Fig. 4) are now each addressed by the contents of the program subcounter PSC (Fig. 1) through the gates 630 and 630a.

T2

The count of the program subcounter PSC (Fig. 1) is advanced one as before.

T4

The gate 742 of Fig. 2 passes the fourth timing pulse T4 to set the "after first RE" flip-flop F703 (Fig. 2).

T5 and T6

The read-out circuits of the left and right HSM 15 and 16 (Fig. 4) have been activated by the left and right read-out gates 730 and 862. At the sixth timing pulse T6, the gates 405 of Fig. 3 are opened to fill the remainder of the A register 26 of Fig. 3 from the left HSM 15 output. At the same time, the gate 512 of Fig. 3 passes the sixth timing pulse T6 to open the gates 544 of Fig. 3 and pass the other three bits from the left HSM 15 of Fig. 4 into the B counter 11 of Fig. 3, and six bits from the right HSM 16 of Fig. 4 through the gates 547 of Fig. 3 into the B counter 11. Note that here the B counter 11 acts as a register.

T8

The gate 734 of Fig. 2 passes the eighth timing pulse T8 to set the "before first RE" flip-flop F705, the high "one" terminal of which now primes one input of the gate 114 of Fig. 1 and the gate 239 of Fig. 1.

Data may be taken from either tape A or tape B. Recall that the B counter 11 (Fig. 3) receives its portion of the instruction during the high status level R002, at the sixth timing pulse T6. If the $2^0$ bit flip-flop in the B counter 11 is set, the gate 601 (Fig. 2) passes the eighth timing pulse T8 to set the tape selector flip-flop F601. The gate 605 is then primed by the output of the "one" terminal of the tape selector flip-flop F601 to start the tape A as soon as the "one" output terminal of the start tape flip-flop F704 is high at a later time. On the other hand, if the $2^1$ bit flip-flop in the B counter 11 (Fig. 3) is set, the gate 602 (Fig. 2) passes the eighth timing pulse T8 to reset the tape selector flip-flop F601 is high and the gate 606 is primed to pass a pulse when the start tape pulse flip-flop F704 is set, to start the B tape. The programmer notes that for this instruction, the $2^0$ bit flip-flop of the B counter 11 and the $2^1$ bit flip-flop of the B counter 11 are not both set at the same time. Therefore, if desired, one flip-flop of the B counter 11, instead of two, could be employed, using the "zero" output in place of the "one" output of the unused flip-flop. Note that the gate 610 for stopping tape B is primed by the same output as that for starting tape B from the zero output of tape selector flip-flop F601 and with the same coding. Also gate 609 for stopping tape B is primed by the high "one" output from the tape selector of flip-flop F601 with gate 605.

Other stages of the B counter 11 are not involved in this instruction. However, other stages and other gates could be employed in similar manner to select other tapes for starting and stopping, if more than two were involved.

T8*a*

The status transition gate 1275 (Fig. 6) passes the eighth delayed timing pulse T8*a* to cause the status level R003 to be high.

3.1.3 *Status level R003 high*

T1

The first EM or ET flip-flop F706 of Fig. 5 is reset by the first timing pulse T1 passed by the gate 741. The left and right HSM 15 and 16 (Fig. 4) are addressed by the gates 630 and 630*a* (Fig. 1) which open in response to the first timing pulse T1 passed through the gate 629 (Fig. 1).

T2

The count of the program subcounter PSC (Fig. 1) is advanced one as before.

T6

The read-out gates 730 and 862 (Fig. 4) are open and their outputs have a high level. The read-out circuits of the left and right HSM 15 and 16 are therefore activated. The six bits from the left HSM 15 pass through the gates 436 (Fig. 3) and are entered into the six highest order stages of the C register 28. At the same time, the three lowest order of these six bits that pass through the gates 324 are entered in the three highest order stages of the C counter 12. Also the six bits from the right HSM 16 (Fig. 4) are passed through the gates 430 (Fig. 3) into the six lowest order stages of the C register 28. At the same time, the same six bits from the right HSM 16 (Fig. 4) are entered through the gates 318 (Fig. 3) into the six lowest order stages of the C counter 12.

Accordingly, the twelve bits, six from the left HSM 15 and the right HSM 16 are entered now in the C register 28, and the nine lowest order of these bits are also entered in the C counter 12.

T7

The gate 239 of Fig. 1 passes the seventh timing pulse T7 to reset the program counter PC and the program subcounter PSC.

T8

The gate 114 (Fig. 1) now passes the eighth timing pulse T8 to open the gates 115. The drum line number of the first address of the item addresses to be surged into the HSM 15, 16, (Fig. 4) originally recorded in the C register 28 of Fig. 3, as part of the staticized instruction, is now transferred into the program counter PC of Fig. 1. In this respect, the program counter receives the entry as a register.

T8*a*

The status transition gate 1219 of Fig. 6 now passes the eighth delayed timing pulse T8*a* to cause the status level RE to be selected as high.

3.2 *Performing operation N*

3.2.1 *Status level RE high—start surge of addresses*

The addresses at which the items to come from the tape are to be stored are now to be surged from the program drum into the surge tank section of the HSM 15, 16. The first item address is on the drum line specified in the C address portion of the instruction. The surge is similar to that described in the aforementioned Bensky et al. Patent 2,679,638. This drum line number is presently stored in the program counter PC (Fig. 1). All the remaining addresses of the items have been placed consecutively on alternate drum lines. The count of the drum line in the drum counter DC is compared with the drum line numbers set into the program counter PC. When equality is indicated, the drum line match flip-flop F125 is set, as in the instruction surge, as described in the said Bensky et al. patent or in the said Bensky application, by a high level from the output of the equal circuit 50 (Fig. 1). The equal circuit 50 may be a group of "or" circuits and "and" gates arranged so that a final gate is primed if and only if all the corresponding inputs are equal. This final gate is primed also by the high status level RE. The fourth timing pulse T4 delayed slightly, but still not so long as to occur after T5, is applied to this final gate through a suitable delay circuit.

The drum line match flip-flop F125 "one" output terminal, now high, primes the gate 142 (Fig. 1), the gate 242 (Fig. 1) and also is applied to activate the timing pulse generator TPG, by opening gates therein so that the generator provides all the timing pulses.

Note that before the count in the program counter PC (Fig. 1) and the drum counter DC are equal, that the machine operates as though it were in the status level RE as previously described in connection with surging instructions from the drum into the memory. In other words, only the timing pulses designated T1, T2, T3, and T4, and delayed pulses up to, but not including T5, in the timing sequence can occur, and timing pulses T5 and later in the higher sequence are inhibited (that is, prevented) by circuitry involving the timing pulse generator and the input thereto from the drum line match flip-flop F125, in a manner more fully described in the said Bensky et al. application. Briefly, the higher pulses T5–T8 cannot be generated until the drum line match flip-flop F125 "one" output terminal is at a high level.

After the complete cycle of the timing pulses starts, and the drum line match flip-flop F125 (Fig. 1) is set, the address surge from the program drum PD (Fig. 1) may begin.

3.2.2 *Address surge—status level RI high*

T1

At the first timing pulse T1, the gate 629 (Fig. 1) passes the first timing pulse T1 to open the gates 630 and 630*a*. The HSM 15, 16 is addressed at the location corresponding to decimal zero by the program subcounter PSC Fig. 1(*a–b*) (recall that the program subcounter PSC was reset with status level R003 high) through these last mentioned gates. Thus the surge into the surge tank section of the memory starts at this zero location in both the memory banks, right and left, in this case. The first address (of 12 bits) surged is then stored at the "zero" location in the left HSM 15 and the zero location in the right HSM 16. Actually, only nine bits are required to designate an address in either left or right HSM 15 or 16. A tenth bit may be used to designate which memory section is to be employed as in the present example. The 11th and 12th bits, superfluous for addressing purposes, are therefore employed to carry other information. These two bits could be carried by other flip-flops, if desired. It is also clear that the size of memory, and the requisite addressing bits could be enlarged or contracted, if desired. The first EM or ET flip-flop F706 (Fig. 5) is reset by the first timing pulse T1 passed through the gate 741. Note that the L and R registers 18 and 19 of Fig. 4 are reset by the first timing pulse T1 passed through the gate 860 to the lead *aa*.

T2

The gate 242 (Fig. 1) passes the second timing pulse T2 to advance the program subcounter PSC by one count beyond zero. The gate 142 passes the second timing pulse T2 to open the gates at the outputs of the read heads and amplifiers 51 and 52. Accordingly, the first address stored at the drum line specified by the program counter PC entry is now read out from the program drum PD. The six bits from the left reading heads and amplifiers 51 (of Fig. 1) are entered in the L register 18 (of Fig. 4). The six bits from the right reading heads and amplifiers 52 (of Fig. 1) are entered in the R register 19 (of Fig. 4). The "write-in" circuits of the left and right HSM 15 and 16 are activated by the high "one" output terminal of the drum line match flip-flop F125.

T6

The first address is now stored, six bits in the zero location in the left HSM 15, and six bits in the zero location in the right HSM 16.

Note that the status level RE now remains high for the next cycle of timing pulses, for there is no status transition gate primed to pass the eighth delayed timing pulse T8*a* to select a different status level to be high.

3.2.3 *Continuation of address surge*

The surge now continues in the manner herein briefly just described. The successive addresses are stored in successive memory locations in the surge tank of both memory banks. Notice that the successive addresses are drawn from the alternate drum lines in succession, because the program subcounter PSC (Fig. 1) is advanced one by reason of the drum line match flip-flop F125 being set, and the gate 242 being primed to pass the second pulse T2 as a triggering pulse each time that an address is drawn off and stored. Every other drum line is not gated out. Accordingly, the drum line bearing the first address desired is itself addressed by the count entered from the C register 28 into the program counter PC. Note that because the drum line match flip-flop F125 (Fig. 1) is set, both the left and right HSM 15 and 16 receive a high level to activate the respective "write-in" circuits from the "one" terminal of the drum line match flip-flop F125, as legended in Fig. 4. Therefore, as in the description in the said copending application of the surge of instructions from the magnetic program drum PD, the six information bits from one set of six data channels from the program drum PD is read into the left HSM 15; and the six information bits from the other six data channels of the program drum PD are read into the right HSM 16, as each cycle of timing pulses T1 to T8 is completed.

Note that the information gated at the read heads and amplifiers 51 and 52 is at a time when one drum line is passing the heads. The next drum line passes the reading heads during the period between T4 and T8 of the same cycle of timing pulses, as explained hereinbefore. Another cycle of timing pulses follows during which the next alternate line is read from the drum. However, this next line is stored in the next succeeding (second) surge tank address, that is, location, in each memory bank surge tank section after the zero. Successive addresses from the program drum PD are now stored in successive addresses in the surge tank of the memory. Each new address at which information from tape is to be stored is placed in the next succeeding higher location in the surge tank section of the HSM 15, 16.

In the surge of instructions from the magnetic program drum PD (Fig. 1) to the HSM 15, 16 the surge is terminated when a specified count has been reached in the program subcounter PSC. In other words, when the number of drum lines required has been surged, the program instruction surge is terminated. However, in surging the addresses from the magnetic program drum PD (Fig. 1) into the memory HSM 15, 16 (Fig. 4), at which addresses the items to be entered from the tape are to be stored, the machine recognizes by the code of the last address to be entered from the drum into the memory that the surge of addresses is complete.

The last address to be surged from the drum is indicated by a unit or binary one in the eleventh order bit (designated as the $2^{10}$ bit) of the twelve significant binary digits read from the program drum PD. Therefore, when the twelve bit addresses are written into the twelve data channels on the magnetic program drum PD, the eleventh bit is always written as zero except for the last address to be surged from the drum. For this last address, this eleventh bit is a one. Note on the schematic (Fig. 2) that there is indicated a separate branch line which carries the $2^{10}$ bit from the output of the left read heads and amplifiers 51 of Fig. 1 (the branch is on Fig. 2) to the gate 735. Accordingly, when the last address to be surged from the drum is surged out of the drum, this eleventh bit passes through the gate 735 which is primed by the high operation level N. The "before first RE" flip-flop F705 (Fig. 2) is reset by the pulse from the gate 735.

With the "before first RE" flip-flop F705 (Fig. 2) in its reset state, the gate 736 is primed and passes the fourth timing pulse T4 to set the start tape flip-flop F704. Accordingly, one or the other of the gates 605 or 606 has its output at a high level, depending on the condition of the tape selector flip-flop F601. If the tape selector flip-flop F601 is in its set condition, the gate 605 output level is high, and tape A is started. If the tape selector flip-flop F601 is in its reset condition, the gate 606 output is high, and the tape B is started.

T8*a*

The gate 241 (Fig. 1) now passes the eighth delayed timing pulse T8*a* to reset the program subcounter PSC and also reset the drum line match flip-flop F125. Accordingly, the gate 142 is closed and no further addresses can be passed from the drum through the read heads and amplifiers 51, 52, as the output gates of the latter are not primed. Also the gate 242 is closed so that the program subcounter PSC is not advanced at each cycle of timing pulses with occurrence of the second timing pulse T2, but holds a zero address. The eighth delayed timing pulse T8*a* is now also passed through the status transition gate 1274 (Fig. 6) and the status level R003 is selected to be high. Note that the second EM or ET flip-flop F702 (Fig. 2) is assumed still in the reset condition. Note that the "before first RE" flip-flop F705 has just been reset due to the $2^{10}$ bit of the last address being a binary "one."

3.2.4 *Status level R003 high—after address surge*

T1

The C counter 12 (Fig. 3) is now reset by the first timing pulse T1 passed through the gate 328. The gate 629 (Fig. 1) passes the first timing pulse T1 to open the gates 630 and **630*a*. Accordingly, the program subcounter PSC, now being in its reset condition for all stages, addresses the left HSM 15, and the right HSM 16 (Fig. 4) at the zero location through the gates 630 and 630*a*, respectively. Accordingly, the HSM 15, 16** is addressed at the surge tank location (address) where is stored the address at which the first item to be read in from the tape is to be entered.

T2

The C register 28 (Fig. 3) is reset by the second timing pulse T2 passed through the gate 442. The gate 244 (Fig. 1) passes the second timing pulse T2 to advance the count in the program subcounter PSC to the next memory location (the address corresponding to decimal one).

T3

The left and right read-out gates 730 and 862 respectively (Fig. 4) pass a high level to the read-out circuits of the left and right HSM 15 and 16 respectively, to activate the readout circuits thereof.

T6

At the sixth timing pulse T6, the gates 436 (Fig. 3) and the gates 430 (Fig. 3) are opened to pass, respectively, the six bits from the left HSM 15 (Fig. 4) into the C register 28 (Fig. 3); and the six bits from the right HSM 16 (Fig. 4) into the C register 28, as previously described in connection with the staticizing of instructions. However, the present entry is an address withdrawn from the memory. Also the gates 324 (Fig. 3) and the gates 318 (Fig. 3) pass three bits and six bits respectively from the left HSM 15 and the right HSM 16 (Fig. 4) into the C counter 12 (Fig. 3). The C counter 12 holds the address (for one bank) the same as the nine least significant bits (the address for one bank) in the C register 28. The duplication is for reasons having to do with other computer operations.

T8

The C counter 12 is assumed to be in its negative counting state, because of a high voltage applied to the "subtract" lead, during the operation N. Each time the C counter 12 is triggered, the address it contains is now decreased by one.

T8*a*

The eighth delayed timing pulse T8*a* is passed through the status transition gate 1229 (Fig. 6) to cause the status level RD now to be high.

3.2.5 *Status level RD high—cycling*

The status level RD now remains high until a character is received from one of the tapes. Note that the start tape pulse from the gate 605 or the gate 606 (Fig. 2) occurred during the next preceding high status level R003. The timing required in the machine of this example between the first timing pulse T1 and the succeeding timing pulse T1 is about twenty microseconds. A considerably greater time than this is required for the tape to get up to speed. Even if at full speed, the tape requires a substantially longer time than twenty microseconds to pass succeeding characters under the read heads. The circuits are arranged so that no tape character is lost. On the other hand, the machine awaits the occurrence or arrival of a significant character on the tape under the read heads. Accordingly, the machine stays in this status level RD high, awaiting the reading of the next character to be passed under the tape reading heads.

The first character read from either tape is passed into the Y register 13 (Fig. 5) through the "or" circuits R904. The first character normally will correspond to a special start message symbol (SM).

The output of the "or" circuits R904 is applied to a group of circuits 66 designated "input tape character present" circuits (Fig. 5). The "input tape character present" circuit is a single "or" circuit receiving the six outputs of the "or" circuits R904 as six inputs. Accordingly, if any character, not all zeroes, is passed through the "or" circuits R904 from either tape, the "input tape character present" circuit provides a pulse output. The output of this "input tape character present" circuit is applied to the pre-character-in flip-flop F806 (Fig. 2) set terminal S. The pre-character-in flip-flop F806 is therefore set as soon as a character is present under the heads of that input tape being driven. The gate 869 (Fig. 2) is thus primed, when a character is present under the input tape read heads, to pass the next sixth timing pulse T6 to set the character-in flip-flop F805. The character-in flip-flop F805 "one" output is then high.

Accordingly, the status transition gate 1253 (Fig. 6) passes the next eighth delayed timing pulse T8*a* to select the status level RI to be high. Note that at the next timing pulse T2, regardless of status level, the gate 870 (Fig. 2) resets the pre-character-in flip-flop F806, because the gate 870 is primed by the "one" output of the character-in flip-flop F805.

Accordingly, the status level RI is now high.

3.2.6 *Status level RI high—first character from tape*

At the first timing pulse T1, the left or right HSM 15, 16 is addressed depending on whether the $2^9$ bit (tenth order) flip-flop of the C register 28 (Fig. 3) is in its reset or set condition respectively. If the $2^9$ bit flip-flop in the C register 28 is set, then the gate 694 (Fig. 4) is primed from the "one" treminal of the $2^9$ bit flip-flop, and the first timing pulse T1 is passed through the gate 694 to open the gates 660 to address the right HSM 16. On the other hand, if the $2^9$ bit flip-flop of the C register 28 (Fig. 3) is in its reset condition, the "zero" terminal of this last-mentioned flip-flop is at a high level to prime the gate 698 (Fig. 4). The gate 698 passes the first timing pulse T1 to open the gates 650 to address the left HSM 15.

T2

The gate 380 (Fig. 3) passes the second timing pulse T2 to trigger the C counter 12. Because the C counter 12 is in its negative or reverse counting state, as pointed out above, the address in the C counter 12 is decreased by one. Certain other particular cases are described in the said copending Bensky application, including operation for negative numbers. Briefly, negative numbers are preceded by a special minus symbol. All the characters of an item following such a minus symbol are entered after being complemented with respect to nine.

When the gate 820 passes the second timing pulse T2, the gates 821 and the gates 825 are opened. The entry in the Y register 13 of Fig. 5 is now transferred, four bits through the gates 821, and two bits (identified as the $2^4$ and $2^5$ bits) through the gates 825, to the L register 18 and the R register 19 of Fig. 4. Note that the five bits designated as $2^0$ to $2^3$ bits are passed through the gates 821. The $2^4$ and $2^5$ bits are passed through the gates 825.

T4

The gate 901 (Fig. 1(*b–d*)) passes the fourth timing pulse T4 to reset the Y register 13.

If the $2^9$ bit flip-flop of the C register 28 (Fig. 3) is reset, the gate 721 (Fig. 4) causes the left HSM 15 to receive and store the information, that is, to be actuated for write-in. If the $2^9$ bit flip-flop of the C register 28 (Fig. 1(*c–a*)) is in its set condition, the gate 850 (Fig. 1(*d–c*)) applies a high level to condition the right HSM 16 to receive and store the information.

If the gate 721 output is high, and the left HSM 15 is activated for write-in, the character is passed through the six gates 722 into the left HSM 15. The gates 722 are opened by the fifth timing pulse T5 passed through the gate 799 primed by the high level from the gate 721. If the right HSM 16 is activated for write-in, the character is passed through the gates 851 into the memory. The gates 851 are opened by the fifth timing pulse T5 passed through the gate 899 primed by the high level from the gate 850.

T8*a*

At the eighth delayed timing pulse T8*a*, the status transition gate 1228 (Fig. 6) causes the status level RD to be selected as high.

3.2.7 *RD–RI sequence*

The status level RD now is high and nothing further occurs until another character comes in from the tape. In other words, as before, the machine cycles or allows one or more cycles of about twenty microseconds to pass until the next character is read in from the tape. There follows a repeated RD–RI sequences. As each character is read into the memory during the status level RI high, the C counter 12 count is decreased one, and the characters are read into successive places in the memory. Each item therefore is stored at an address beginning with the address withdrawn from the surge section, and including lower numbered spaces. Succeeding RD–RI cycles are the same as those just described, unless an end message (EM) or end tape (ET) or an item separation symbol (ISS) are encountered. These particular cases are described in greater detail hereinafter.

It is in fact contemplated that the first character from a tape will be a special start message symbol, which is to be stored at the first address. It is contemplated that the second character will be an item separation symbol, to be stored at the second address.

3.2.8 *Status level RD high—item separation symbol (ISS)*

If a character now enters from the tape to the Y register 18 which is an item separation symbol ISS, as, for example, the second character, the pre-character-in flip-flop F806 (Fig. 2) is set as in the case of an RD high status level already described. The gate 869 passes the sixth timing pulse T6 to set the character-in flip-flop F805.

At the end of this RD cycle, the status transition gate 1272 (Fig. 6) now passes the eighth delayed timing pulse T8*a* to the set R003, and the status level R003 becomes high. Note that the status transition gate 1272 (Fig. 6) is primed by a high output from the ISS lead in the left symbol recognition circuits 23.

3.2.9. *Status level R003 high—after ISS recognition*

Note that the program subcounter PSC (Fig. 1) has been advanced in the preceding high status level R003 by a second timing pulse from the gate 244. Accordingly, the program subcounter PSC addresses (in this cycle) the memory surge section at a location one higher than that of the address last withdrawn. The address last withdrawn was at the location at which the character of the first item on the tape was to be stored. The memory surge location (address) now in the program subcounter PSC is that of the future address of the first character of the next item on the tape. The process now is the same as that described for the high status level R003 after the first RE as described above, and the next address is withdrawn from the surge tank location and entered in the C register 28 (Fig. 3), and the C counter 12 (Fig. 4).

T8*a*

At the eighth delayed timing pulse T8*a*, the status transition gate 1254 (Fig. 6) causes the status level RI to be high.

3.2.10 *Status level RI high—next message started*

The item separation symbol (ISS) is to be read into the HSM 15, 16 at the address last staticized in the last R003 high status level. Note that this ISS is treated as the first character of the succeeding message. The steps to be followed are the same as that described in the high status level RI described above (sec. 3.2.6).

3.2.11 *Status level RD high—successive item separation symbols*

If there are no characters in an item, two item separation symbols follow each other from the tape.

When an item separation symbol is detected, the high status level RD is followed by the high status level R003, and the next item address is staticized as described above (sec. 3.2.4) followed by the high status level RI (as in sec. 3.2.6) for reading of the symbol into the HSM 15 or 16. If, now, a successive ISS is detected, in one of the succeeding RD cycles, without another character intervening, again the status level R003 is made high, and an RI cycle follows, etc.

Note that the status transition gate 1272 (Fig. 1G) is primed by the "one" output of the character-in flip-flop F805 (Fig. 2), and also by the high ISS lead. Accordingly, if an item separation symbol is detected, the status level R003 is selected immediately, without the status level RI being selected after the RD status level is high. After the new address is staticized during the high R003 level, then the new ISS is written in during a high RI level, etc.

3.2.12 *Status level RD high—end message (EM) symbol*

Finally, the least significant character of the last item of a message is followed by an end message (EM) symbol. The EM symbol is read into the Y register 13 (Fig. 5) during a high status level RD.

The pre-character-in flip-flop F806 (Fig. 2) and the character-in flip-flop F805 are set in the manner as above described. As the end message symbol (EM) is entered into the Y register 13, the "or" circuits R920 (Fig. 5) have a high level output. The status transition gate 1253 (Fig. 6) is primed by the "one" output terminal of the character-in flip-flop F805 (Fig. 2) and by the NOT ISS lead of Fig. 5. The status transition gate 1253 (Fig. 6) therefore passes the eighth delayed timing pulse T8*a* to select the status level RI to be high.

3.2.13 *Status level RI high—after end of message (EM)*

There are now two possibilities. The first is that the last item address was employed in entering the message just ending with EM. The second is that the end message symbol EM does not coincide with the last item address. Recall at this point that the last item address in its twelve digit binary number form has a binary "one" in the eleventh last significant digit rather than a binary zero.

The two cases are presented in order.

3.2.13*a* *EM or end tape (ET) and last address*

The presence of the EM symbol in the Y register 13 is "recognized" or "detected" by the left recognition circuits 23, and particularly by the "or" circuits R920 (Fig. 5) as mentioned before. The gate 485 and the gate 740 of Fig. 5 are now primed by the high level from the output of the "or" circuits R920.

The gate 485 passes the first timing pulse T1 which was passed by the gate 942. The output of the gate 485 is applied to the "set" terminal of the $2^{11}$ (twelfth) bit flip-flop of the C register 28 (Fig. 3). The C register 28 $2^{11}$ bit (twelfth order) flip-flop is therefore set.

Setting this twelfth bit flip-flop prevents read-in because the high "zero" output of this stage provides a priming voltage for the gates 721 and 850 of Fig. 4. Therefore the gates 721 and 850 are both closed, and the write-in circuits of the left and right HSM 15, 16 are not actuated. Also, the EM symbol cannot be read into the HSM 15, 16 through the gates 722 between the L register 18 and the left HSM 15; nor can the EM symbol be read from the R register 19 into the right HSM 16 through the gates 851, as the gates 722 and 851 are also closed.

The first timing pulse T1 passed by the gate 942 is also applied to the gate 740 and through the gate 740 to the set terminal S of the first EM or ET flip-flop F706. Accordingly, the gates 609 or 610 (Fig. 2) pass a high level to apply a pulse to stop tape A or tape B whichever was running.

The "one" output of the first EM or ET flip-flop F706 (Fig. 5) also primes the gate 732 (Fig. 2). The third timing pulse T3 is passed by the gate 732 to set the second EM or ET flip-flop F702 (Fig. 2).

T4

The fourth timing pulse is passed through the gate 901 to reset the Y register 13.

As noted above, the address of the last message was staticized during the previous R003 and has its $2^{10}$ (that is, eleventh order) bit a "one." Accordingly, the gate 733 (Fig. 2) is primed by the "one" output terminal of the $2^{10}$ bit flip-flop from the C register 28 of Fig. 3. Therefore the eighth timing pulse T8 is passed by the gate 733 of Fig. 2 to reset the "after first RE" flip-flop F705 (Fig. 2). The address of the last item of the message was staticized during the previous high status level R003 in the C register 28 of Fig. 3. Because this is the address of the last message, the eleventh bit ($2^{10}$ bit) of the address is a binary "one." Accordingly, the $2^{10}$ bit flip-flop of the C register 28 is set. In the operations which may follow, the "after first RE" flip-flop F703 is thus in its reset condition, in order, for example, that its "zero" output lead may prime a status transition gate 1277 (Fig. 6) in preparation for an instruction surge. Recall that the drum line number of the next instruction to be surged from the drum was entered from the HSM 15, 16 (Fig. 4) to the A register 26 (Fig. 1) and the B counter 11 (Fig. 3) at the beginning of the operation read-in from tape, as part of the instruction.

The gate 101 (Fig. 1) is primed by the high "one" terminal of the second EM or ET flip-flop F702 (Fig. 1) at two inputs, and by the high RI status level and the high $2^{10}$ bit flip-flop "one" output of the C register 28 (Fig. 3) respectively at its other two inputs. Therefore, the gate 101 (Fig. 1) is now open to pass the eighth timing pulse T8 to open the gates 102. The twelve bits entered in the A register 26 and B counter 11 of Fig. 3 are now entered in the program counter PC through the gates 102. Accordingly, the program counter PC is set to the drum line number of the next instruction to be surged into the memory.

The status transition gate 1218 (Fig. 6) now passes the eighth delayed timing pulse **T8*a* to select the status level RE to be high. The next set of instructions are surged into the HSM 15, 16** in a manner described, for example, in the said Bensky application.

Briefly, when the proper drum line count is reached in the drum counter DC, the third equal circuit 50 passes a pulse to start the instruction surge. When the predetermined number of instructions has been surged, a certain predetermined count is reached in the program subcounter PSC of Fig. 1. The "END" lead is then high. Also, the after first RE flip-flop F703 is in the reset condition, due to the eighth timing pulse T8 passed through the gate 733 after the last address was withdrawn. Note that the gate 733 of Fig. 1 is primed by the "one" output of the $2^{10}$ bit flip-flop of the C register 28 and the status level RI, and the "one" output of the second EM or ET flip-flop F702. The latter flip-flop is set because it is set at the time the first EM or ET symbol is recognized during the operation N. Consequently, since the after first RE flip-flop F703 is in its reset condition, and the surge of instructions is completed as indicated by the "END" lead being high, the gate 1277 passes the eighth delayed timing pulse **T8*a* to cause the status level R001 to become high. A new instruction is now withdrawn from the HSM 15, 16. At the first timing pulse T1 with the status level R001 high, the O register 30 is reset in preparation for the entry of the new instruction. Thus the operation level N becomes low and the appropriate operation level becomes high upon entry in the O register 30** of the part of the coded instruction to be entered therein.

3.2.13*b* *EM or ET and not last address*

In this event, the end message symbol EM or end of tape symbol ET, does not coincide with the last item address. However, the EM or ET symbol is not to be read into, that is, entered into the memory. Instead, an ISS is to be read into the memory at the next address. In the same manner as for the high status level RI cycle previously described, as, for example, in sec. 3.2.6 the first timing pulse T1 is passed by the gate 942 (Fig. 5) to the gate 485 to set the $2^{11}$ bit flip-flop of the C register 28 (Fig. 3). Accordingly, the left and right HSM 15 and 16 of Fig. 4 cannot receive information. Note that, as before, the gate 721 and the gate 850 of Fig. 4 no longer receive a high voltage from the "zero" output terminal of the $2^{11}$ bit flip-flop of the C register 28. The gate 740 (Fig. 5) also receives the first timing pulse T1 passed by the gate 942. The gate 740 (Fig. 5) passes the received pulse to set the first EM or ET flip-flop F706, as in the high status level RI cycle just described. The tapes are stopped by the pulse through the gates 609 and 610, as before.

The third timing pulse T3 is passed through the gate 732 (Fig. 2) to set the second EM or ET flip-flop F702. Note, however, that the $2^{10}$ bit flip-flop of the C register 28 is in the reset condition because the last address is not entered therein. Accordingly, the status transition gate 1273 (Fig. 6) is primed.

The status transition gate 1273 (Fig. 6) passes the eighth delayed timing pulse **T8*a* to select the status level R003** to be high.

3.2.14 *Status level R003 high—after status level RI high, and after EM or ET and not last item address*

The next item address is staticized in the same manner as in the previous high status level R003, operation level N high. At the end of this status level R003, the status level RI is selected to be high. Recall that the second EM or ET flip-flop F702 (Fig. 2) is set. Status transition gate 1256 is therefore primed, and passes the eighth delayed timing pulse **T8*a*** to the "set RI" lead.

3.2.15 *Status level RI high—after status level RI high, and after EM or ET and not last item address*

Note that when the status level RI was previously high, after the EM symbol was first recognized (and as in sec. 3.2.13), the gate 901 (Fig. 5) was primed by the high operation level N and the high status level RI, to pass the fourth timing pulse T4 to reset the Y register 13 (Fig. 5). In the current status level RI high, the output of the "or" circuits R920 (Fig. 5) is low, and the gate 485 is not primed, because these "or" circuits receive the output of the Y register 13. Accordingly, as explained hereinbefore, the left or right HSM 15 or 16 (Fig. 4) may be activated for receiving information, since the $2^{11}$ bit flip-flop of the C register 28 remains in reset condition.

However, instead of receiving the contents of the Y register 13 (Fig. 5), at the address staticized when the status level R003 was last high, an ISS is artificially entered at this address. The gate 859 (Fig. 5) is primed by the high "one" output of the second EM or ET flip-flop F702 of Fig. 2. Note that this second EM or ET flip-flop F702 is set from the time an EM or ET symbol is indicated until the last address of the read-in operation is staticized and the read-in operation is completed.

The gate 859 (Fig. 5) therefore passes the second timing pulse T2 to enter an item separation symbol (coded, for example, 11 11 00) into the L and R registers 18 and 19 (Fig. 4) and thence into the left or right HSM 15 or 16. Note that although the gates 821 and the gates 825 are opened, they have no output because all of the Y register 13 (Fig. 5) "one" outputs are at a low level, the Y register 13 having been reset. The pulse from the gate 859 simply imposes a high level on the $2^3$ to $2^5$ bit leads. The write-in from the L and R registers 18 and 19 is accomplished in the same manner as in the RI cycles previously described.

After the ISS is read into the left or right HSM 15 or 16, the second EM or ET flip-flop F702 (Fig. 2) remains in its set condition until the status level R001 is again high. The $2^{10}$ bit flip-flop of the C register 28 is in its reset condition because, as has been assumed, the EM symbol did not coincide with the last address. The RI status level is also high. Therefore, the status transition gate 1273 (Fig. 6) is primed to pass the eighth delayed timing pulse T8*a*. The status level R003 is now selected to become high.

A new address is now withdrawn from the next location in the surge section and staticized during the cycle in which the status level R003 is high. The second EM or ET flip-flop F702 (Fig. 2) is still in its set condition. Therefore the status transition gate 1256 (Fig. 6) is primed to pass the eighth delayed timing pulse T8*a* to the "set RI" lead. The status level RI now becomes high. If the new address is not the last address of the program, an item separation symbol is again artificially read into the left or right HSM 15, 16.

Finally, in the status level R003, the last address of the program is staticized in the C register 28 (Fig. 3). The $2^{10}$ bit flip-flop of the C register 28 is in its set condition. The gate 101 (Fig. 1) is primed to pass the eighth timing pulse T8 and open the gates 102 (Fig. 1) to enter into the program counter PC the drum line number of the next instruction to be surged into the memory. The manner in which this drum line number is entered is similar to that described above, in connection with the case in which the EM symbol is recognized and at the same time he last item address is entered in the C register 28 (sec. 2.13*a*).

As described abo the status transition gate 1218 (Fig. 6) passes the ghth delayed timing pulse T8*a* to cause the status level RE to be high.

3.2.16 *Status level RI high with end of tape (ET)*

If the left symbol recognition circuits 22 detect an end tape (ET) symbol stored in the Y register 13 (Fig. 5), the output of the "or" circuits R921 (ET lead) is high. The first timing pulse T1 passes through the gate 942 (Fig. 5). The gate 942 output then passes through the gate 740 of Fig. 5 to set the first EM or ET flip-flop F706. Note that the gate 485 (Fig. 5) is not open. The third timing pulse T3 is then passed through the gate 732 (Fig. 2) now primed, to set the second EM or ET flip-flop F702 of Fig. 2. Note also that the status transition gate 1218 (Fig. 6) is not primed, because the last address has not been reached and the $2^{10}$ bit flip-flop of the C register 28 (Fig. 3) is in reset condition. The high output of the first EM or ET flip-flop F706 "one" is applied to the gates 609 and 610 (Fig. 2). Therefore, the tapes are stopped. In this situation, either a new tape should be started, or the end tape ET symbol is inserted at the wrong place on the tape.

It is contemplated that the ET symbol immediately follows an EM symbol after the last message on a tape. Therefore, such a situation normally follows immediately after a surge of addresses. After the surge, the selected tape is started in the manner already described. The high "one" output of the first EM or ET flip-flop F706 (Fig. 5), because of the pulse through gate 609 or 610 of Fig. 2, causes whichever tape is started to be stopped immediately. The $2^{11}$ bit flip-flop of the C register 28 (Fig. 3) is in its reset condition because that stage was reset during the address surge. The ET symbol is now read into the memory from the Y register 13 (Fig. 5), as any character would be, in the manner already described.

The status transition gate 1273 now passes the eighth delayed timing pulse T8*a* to the "set R003" lead. A new address is withdrawn, and either the last address is read out, as described in sec. 3.2.13*a* above, or repeated cycles of status levels RI and R003 follow, and ISS's are artificially entered at the excess addresses, if any, as described in sec. 3.2.13*b*, above, until the last address is withdrawn.

After the last address is withdrawn, the status transition gate 1218 of Fig. 6 passes the eighth delayed timing pulse T8*a* to cause the status level RE to be high. The next set of instructions are surged into the HSM 15, 16 as previously mentioned, and may be programmed to operate upon the information just entered into the memory from the tape. If desired, a suitable recognition circuit may respond to the ET symbol, to sound an alarm, or cause the machine to stop. However, the ET symbol may also be recognized by suitable programming. For example, the subsequent instructions may be such that a conditional transfer of control to the machine instruction "stop" ensues if an ET symbol is at the first address of any group, by virtue of a suitable sub-routine.

3.3 *Flow of status levels and summary of operation*

The instruction to read-in from tape in this machine is coded into an operation portion and three address portions. The operation portion is withdrawn from the left HSM 15 and staticized in the O register 30. The code for this operation, read-in from tape, may be, for example, 001 101.

The first address portion of the instruction is coded in twelve bits. Six of these bits come from the right HSM 16 and six from the left HSM 15. Nine bits of these twelve are staticized in the A register 26, and three bits are staticized in the B counter 11. These twelve bits are the number of the first drum line of the instruction to be withdrawn from the drum after this current instruction of read-in from tape is completed. For example, the drum line, in binary code, may be coded as: 000 101 100 011.

The second address is coded in six bits of which three bits are taken from the left HSM 15 and three bits from the right HSM 16. These six bits are staticized as the six lower order bits in the B counter 11. These six bits of the second address are for the purposes of tape identification, and in the present machine the four higher order bits are superfluous. The second address, for example, may be coded as: 000 001. This second address of this example may be interpreted as the selection of tape A.

The third address is coded in twelve bits, of which six are taken from the left HSM 15 and the other six from the right HSM 16. All twelve of these bits are stored in the C register 28 and additionally the lower order nine bits are stored in the C counter 12. This third address indicates the drum line to which the sequence of item addresses starts and may be coded, for example, as: 001 010 110 010.

Note that six bits are allowed for tape identification. Some of these bits are redundant and permit of expansion of the system. Also note that in the addressing circuits here employed, ten bits fully specify the memory location, including the bank to be used.

There are a total of thirty-six bits in the instruction, twelve (six from each memory bank) being staticized during each of the high status levels R001, R002, and R003 when the instruction is being staticized. In this particular instance, the three addresses just described differ from the ordinary three addresses used in this computer, a greater number of bits being allocated to the first and third addresses and fewer to the second, although the same number of bits are stored in the same registers.

It is of interest to notice that the instruction for reading in from tape may be considered as composed of one operation and $n+2$ addresses, where $n$ is the number of addresses surged into the memory section. As the instruction is performed, the $n$ items are stored at the $n$ addresses of the instruction, the other two addresses serving, respectively, to indicate the drum line where the sequence of $n$ addresses may be started and the drum line for the next instruction after the operation is completed.

If the address at which an item is to be placed is in the right HSM 16, the tenth order ($2^9$ bit) of the binary coded address is a "one." If the address at which an item is to be placed is in the left HSM 15, then the tenth bit ($2^9$ bit) is a zero.

The last of the addresses to be surged from the drum is indicated in the coding by placing a unit or binary "one" in the eleventh bit (that is $2^{10}$, or eleventh order bit) in the binary code of the last address. Thus this $2^{10}$ bit, redundant for addressing, is used to indicate the occurrence of the last address.

The operation "read-in from tape" (N) is employed to read into the computer messages from the magnetic tape. Any new message is to be read into the computer memory item by item, the items being placed at addresses specified on the drum and beginning with the address specified on the drum line in the fourth portion of the instruction. It is assumed that the maximum number of items in each message is the same. A specific maximum number of characters is assumed for each item. However, this is a non-standard maximum, which is subject to choice by the operator. Thus, an address for a specific item implies that it is the location of the item separation symbol, and that the remaining characters of the item are stored in successively lower addresses. Consecutive items of the message may or may not be stored in adjacent locations in the HSM 15, 16. The maximum number of items may differ from message to message.

Refer to the flow diagram of status levels, Fig. 7, as well as to Figs. 1 to 6. The first step in the operation is the staticizing of the instruction read-in from tape (N) by the sequence of R001, R002, R003 high status levels. The instruction for selecting the operation level N to be high is transferred to the O register 30 (Fig. 3) during the high status level R001. The operation level N is then made high by means of the operation matrix OM. The remainder of the instruction is entered, as previously described, in the A register 26, the C register 28, and the B counter 11. The entry in the C counter 12 conforms to that of the nine lowest order bits in the C register 28. The next status level selected as high is RE.

The machine searches for the drum line indicated by the C address of the instruction. This drum line contains the first item address. The machine locates the line and then surges that line and subsequent alternate lines on the drum into the HSM 15, 16 into the surge tank at locations automatically prescribed by the program subcounter PSC. These locations (addresses) at which the item addresses are stored start at zero in the present machine. The surge of addresses stops when the last address code is recognized by the coding, because the address of the last item is coded with the $2^{10}$ bit as a binary "one."

The machine then selects the status level R003 to be high and the tape is started. Note that the first RE status level high with the operation level N high ends with a coded drum line.

The address stored in the memory for the first character of the incoming message is staticized or stored in the various registers while the status level R003 is high. The machine then selects the status level RD to be high and cycles (that is, the timing pulses continue their cycles without a different status level becoming high) until the first character is read from tape. The first character normally should be a start message SM symbol. The status RI is now selected.

The start message (SM) symbol or first character is read into the HSM 15, 16 at the first address withdrawn from the memory HSM 15, 16. The status level RD is now selected to be high and the machine again cycles waiting for the next character. If another character, alphabetic or numeric, is received, it is read into the address one lower than the location of the SM symbol. If an item separation symbol ISS is read from the tape, then the address of the next item to be read from the tape is withdrawn from the memory surge tank section and staticized, that is, stored in the registers. When the status level RI is high, the item separation symbol is then read into the second data item address.

The machine again selects the status level RD and cycles in RD until the next character is received. Then in the status level RI, the machine reads the next character after the item separation symbol into the next address location. Note that the first character in the most significant address position (or that corresponding to the largest number) is an item separation symbol. In continuing steps of ($a$) cycling in RD, and ($b$) reading into the memory during an RI cycle, the succeeding characters are entered in successive memory places. The detection of an item separation symbol during an RD cycle indicates that the second item is completely read and another item should now be read from the tape and its characters stored at their assigned address. The machine then returns to the high status level R003, reads an ISS into the next address location, and succeeding characters into locations successively lower in order (that is, corresponding to successively lower numbers).

If an item contains no data, two consecutive item separation symbols appear on the tape. The first of these item separation symbols is stored in the HSM 15, 16 at the location called for by the next address, during the high status level RI, as described above. The machine then goes to the high status level RD. The next character that appears is another ISS. The status level R003 is now selected to be high, so that the address of the next item to be stored is entered in the various registers. Thereupon an item separation symbol is entered at the address of this item, during the succeeding high status level RI.

After the last item in the message, an end of message EM symbol occurs. The symbol is not written into the HSM 15, 16. An address is programmed for every item in a message. Therefore, the items preferably are arranged in the message so that those which most often contain data are in the most significant part of the message, and are read from the tape first. The EM symbol occurs after the last item in the message that contains data. The tape space is thus conserved. However, it is possible for consecutive items at the end of the message to be omitted. The addresses of these items, if omitted, have been surged into the HSM 15, 16.

The end message (EM) symbol is detected in the high status level RD. The machine then selects the status level RI to be high. During the high status level RI, the end message (EM) symbol is discarded. At this point, if all the items called for in the message have been entered, the machine reenters in the program counter PC the drum line of the next instruction, which had been held in temporary storage, and then selects the status level RE to be high. The drum line of the next instruction required in the program to operate on the various data was entered in the A register 26 and part of the B counter 11 during the staticizing of the instruction for read-in from tape, operation N. When the status level RE is now high, the machine searches the drum for the drum line of the next instruction and then surges a group of instructions into the HSM 15, 16, for example, as described in the said Bensky et al. patent or in the said copending Bensky application.

If however, one or more items are missing at the end of the message (that is, the program calls for various items which are not found on the tape) the machine selects the status level R003 to be high. With the status level R003 high, the next item address is staticized. The machine then enters the high status level RI, and an item separation symbol is artifically placed in the staticized memory location of the missing data item.

If the last data item address has still not appeared, the machine continues in a reiterated R003–RI sequence. In this sequence the machine reads out consecutive data item addresses and artificially places an item separation symbol in the memory location of each missing data item. When the last data item address is detected, the machine selects the status level RE to be high. With the high status level RE, the program instructions are surged from the program drum into the HSM 15, 16, as noted above. When the surge is completed, the machine selects the status level R001 to be high, and begins operating on the data now in the memory in the manner heretofore described.

The instruction "read-in from tape" (operation N) may be employed by a programmer to place as many extra item separation symbols (ISS's) as he desires by adding extra addresses for these symbols on the drum after the addresses of all the items to be read from the tape. Additional programming flexibility is thus secured.

All items on the tape are preceded by an item separation symbol ISS except for the start message symbol SM. Therefore, when an item is written from the tape into the HSM 15, 16, the item separation symbol is written also. This symbol is placed in the staticized address of the item location in the HSM 15, 16. When these items are operated upon and the results placed back in the HSM 15, 16 result locations, there is no ISS in the first character of the item. However, because the address allocated for the highest order binary coded digit or character for the result item is known, an item separation symbol can be artificially placed in the next higher location during the read-in operation preparatory to performing the program.

To thus obtain the entry of the desired item separation symbols, note that the number of item addresses placed on the drum may correspond to the maximum number of items in the tape message. The addresses of the HSM 15, 16 locations for the item separation symbols of the result items may be placed after the data item addresses on the drum. The last item address to be surged from the drum into the HSM 15, 16 is indicated by the $2^{10}$ (eleventh) bit of the item address being a binary one. The situation is the same as that where the number of data items on the tape are less than the number of item addresses. As far as the machine is concerned, there are more data item addresses than data items, and an item separation symbol is placed in the HSM 15, 16 location specified by each address that does not have an item corresponding to it on the tape. These entries are continued until the final address is detected by reason of the address coding, and the $2^{10}$ bit flip-flop of the C register 28 is set.

4. CONCLUSION

It is apparent that the invention thus disclosed provides a superior means and method of entering items from a serial memory, such as a tape or the like, to a static or random access memory, such as a magnetic core memory, a selectron, or the like. The invention provides great flexibility in programming for a computer. It should be understood that by the term computer, it is intended to include any type of information handling device having an internal, static memory. The method and system according to the invention provide "random composition" of the non-standard, variable maximum length items in the internal memory of the computer. Thus the items are entered at preselected addresses, as desired. Moreover, artificial symbols may be entered at desired preselected addresses.

What is claimed is:

1. In an information handling device including a memory having different addresses of entry, a system for entering in said memory electrically coded, serially presented information, each item of information comprising a number of one or more serially presented characters coded as electrical signals, each said item being separated from the preceding or succeeding item by special symbols, also electrically coded, said system comprising a memory section, means to store in said memory section preselected addresses for the successive items, means responsive to the presentation of a said special symbol to withdraw an address from said section, and means to store the item succeeding the said special symbol presentation in the said memory character by character starting at a memory entry corresponding to the said address thus withdrawn at successive said number of entries, whereby the serially presented items may be stored at desired addresses in said memory.

2. A system as claimed in claim 1, further comprising means responsive to an address coded as the last address, said last-named means being operative to terminate the storing of said items.

3. In an information handling device including a memory having different addresses of entry, a system for entering in said memory electrically coded, serially presented information, each item of information comprising a number of one or more serially presented characters coded as electrical signals, each said item being separated from the preceding or succeeding item by special symbols, also electrically coded, said system comprising a memory section, means to store in said memory section preselected addresses for the successive items, means responsive to the presentation of a said special symbol to withdraw an address from said section, and means to store the item succeeding the said special symbol presentation in the said memory character by character starting at a memory entry corresponding to the said address thus withdrawn at successive said number of entries, whereby the serially presented items may be stored at desired addresses in said memory, the number of said addresses exceeding the number of said items, and further comprising means responsive to the completion of entry of all said items to withdraw the excess of said addresses sequentially, and to store at each said excess address as withdrawn a predetermined coded symbol.

4. A system as claimed in claim 3, said predetermined coded symbol being the same as said special symbol.

5. In an information handling device comprising a random access memory having addressing means, a system for entering electrically coded, serially presented information, each item of information being separated from the preceding or succeeding item by special symbols, also electrically coded, said system comprising a memory section, means to store in said memory section addresses for the successive items, means responsive to the occurrence of one of said special symbols to withdraw an address from said section, means to apply said address to said memory addressing means, and means to store the item succeeding the said symbol occurrence in the said random access memory at the said withdrawn address thus applied, whereby the incoming items may be stored at desired addresses in said static memory.

6. A system as claimed in claim 5, the last said address being specially coded, and further comprising means responsive to the said last address to terminate the item storage.

7. A system as claimed in claim 5, said information handling device comprising cyclic storage means, said addresses being preselected and stored in said cyclic storage means, said means to store addresses in said memory section including means to surge said addresses from said cyclic storage means into said section.

8. A computer comprising an internal memory, an internal random-access memory section, a cyclic storage means having a preselected list of addresses, means to withdraw said addresses from said storage means and enter in succession the said addresses into the said section, means to detect serially presented items of electrically coded information each of a number of one or more electrically coded characters, each said item having as the first character thereof a special symbol, means responsive to the occurrence of a said special symbol to withdraw a corresponding address from said section, and means to store each said item character by character in said internal memory at successive entries beginning at that address withdrawn from said section in correspondence to the said symbol of that said item and extending for said number of characters.

9. A system as claimed in claim 8, further comprising means responsive to withdrawal from said memory section of an address coded as the last address to terminate the storage of said items in said internal memory.

10. A system as claimed in claim 8, further comprising means responsive to the withdrawal from said cyclic storage means of an address coded as the last address to terminate the said withdrawal of addresses from said cyclic storage means, and means responsive to the withdrawal of said last address from said section to terminate the storage of items in said internal memory.

11. A computer comprising an internal memory, an internal random-access memory section, a cyclic storage means having a preselected list of addresses, means to withdraw said addresses from said storage means and enter in succession the said addresses into the said section, means to detect serially presented items of electrically coded information each of a number of one or more electrically coded characters, each said item having as the first character thereof a special symbol, means responsive to the occurrence of a said special symbol to withdraw a corresponding address from said section, and means to store each said item character by character in said internal memory at successive entries beginning at that address withdrawn from said section in correspondence to the said symbol of that said item and extending for said number of characters, the last of said preselected addresses being specially coded, means to continue entries at addresses in excess of the number of said items in said memory by entry of a specially coded character at each said excess address, and means responsive to recognition of said last preselected address to terminate said entries at said excess addresses after the entry at said last preselected address.

12. A computer comprising an internal memory, an internal memory section, a cyclic storage means having a preselected list of addresses, means to withdraw said addresses from said storage means and enter in succession the said addresses into the said section, means to detect serially presented items of electrically coded information each of one or more characters, each said item having as the first character thereof a special symbol, means responsive to the occurrence of a said special symbol to withdraw a corresponding address from said section, means to store each said item at an entry in said internal memory beginning at that address withdrawn from said section in correspondence to the said symbol of that said item, the last of said preselected addresses being specially coded, means to continue entries in said memory at addresses in excess of the number of said items, and means to terminate said entries at said excess addresses on withdrawal of said last preselected address from said section.

13. A computer comprising an internal memory having addresses, a magnetic program drum means having stored therein a preselected list of addresses of said memory, a memory section, means to surge said addresses by withdrawal from said drum means and successive entry into said section, means to detect serially presented items of electrically coded information each of one or more characters, each said item having as the first character thereof a special symbol, means responsive to the occurrence of a said special symbol to withdraw a corresponding address from said section, a register to hold the address so withdrawn, means to store said symbol at said corresponding address in said memory, means to change each said address to a succeeding address in said register in response to each successive occurrence of each of one or more characters other than a said special symbol, means to store said last-mentioned one or more characters at the said last-mentioned succeeding memory addresses, respectively, whereby each item is stored in said memory at respective addresses each beginning with one of said preselected addresses.

14. A computer comprising an internal memory having addresses and an internal memory section, a magnetic program drum means having stored therein a preselected list of addresses of said memory, means to surge said list of addresses from said drum means in succession into the said section, means to detect serially presented items of electrically coded information each of one or more characters, each said item being recognized by a preceding special, electrically coded symbol, means responsive to the presentation of a said special symbol to withdraw a corresponding address from said section, a register means to hold the address so withdrawn, means to store successive characters of each said item beginning at that address withdrawn from said section in correspondence to the said symbol of that said item in successive memory address locations including means to advance in said register the address successively and to store said one or more successive characters of said corresponding item at said successive register addresses, and means responsive to an address coded as the last address to terminate said surge upon the withdrawal of said last address from said drum means.

15. A computer as claimed in claim 14, comprising means responsive to a specially coded symbol indicating the last of said items, means responsive to said indicating means and to the presentation before withdrawal of said last address from said memory of said last item symbol for entering a predetermined symbol at each of the remaining addresses, and means responsive to the withdrawal of said last address from said memory to terminate said storage in said memory.

16. A computer comprising an internal memory having addresses, an internal memory section, a magnetic program drum means having stored therein a preselected list of addresses of said memory means to surge said list of addresses from said drum means in succession into the said section, means to detect serially presented items of electrically coded information, each said item being recognized by a special symbol, means responsive to the presentation of a said special symbol to withdraw a corresponding address from said section, means to store each said item beginning at that address withdrawn from said section in correspondence to the said symbol of that said item, means responsive to an address coded as the last address to terminate said surge upon the withdrawal of said last address from said drum means, means responsive to a specially coded symbol indicating the last of said items, means responsive to said indicating means and to presentation before the withdrawal of said last address from said memory, of said last item symbol for storing a predetermined symbol at each of the remaining addresses, and means responsive to the withdrawal of said last address from said memory to terminate said storage in said memory.

17. In a computer including a memory having different addresses of entry, a system for entering in said memory electrically coded, serially presented information, each item of information being separated from the preceding or succeeding item by item separation symbols, also electrically coded, and a special electrically coded end message symbol being presented at the end of said information, said system comprising a memory section, means to store in said memory section preselected addresses for the successive items, one said address being coded as the last address, means responsive to the presentation of a said item separation symbol to withdraw an address from said section, means to store the item succeeding the said item separation symbol presentation in the said memory at the said address thus withdrawn, means responsive to the withdrawal of said last address from said section to terminate the storage in said memory at the withdrawn addresses, and means responsive to the presentation of a said end message symbol before the withdrawal of said last address to continue the withdrawal of the remaining addresses and to enter a predetermined symbol at the said remaining addresses.

18. In a computer having an internal memory, a system for entering in said memory electrically coded, serially presented information, each item of information comprising one or more serially presented, electrically coded characters and being separated from a preceding or succeeding item by a special character, said system comprising a memory section, means to enter in said memory section preselected addresses for the successive items, means responsive to the presentation of a said special symbol to withdraw an address from said memory section, register means to staticize the address withdrawn, means to actuate the address circuits of said memory to the contents of said register, and means to store each of said items beginning at the corresponding address withdrawn therefor and at successive addresses as required for any other than said special characters, said last-mentioned means including means to advance the count of said register contents on presentation of each succeeding character not a special symbol.

References Cited in the file of this patent

UNITED STATES PATENTS

| | | |
|---|---|---|
| 2,636,672 | Hamilton | Apr. 28, 1953 |
| 2,679,638 | Benski | May 25, 1954 |

OTHER REFERENCES

Publication I, "An Electronic Computer," by Beard and Pearey, in "Journal of Scientific Instruments," October 1952, pp. 305–311.

Publication II, "The Edsac Computer," by Wilkes, in Joint AIEE Computer Conference, published February 1952 (p. 79 relied upon).